US009780822B2

(12) United States Patent
Krishnamoorthi et al.

(10) Patent No.: US 9,780,822 B2
(45) Date of Patent: *Oct. 3, 2017

(54) MANAGING TRANSMITTER COLLISIONS

(71) Applicant: QUALCOMM Incorporated, San Diego, CA (US)

(72) Inventors: Deepak Krishnamoorthi, San Diego, CA (US); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/808,007

(22) Filed: Jul. 24, 2015

(65) Prior Publication Data
US 2016/0050685 A1 Feb. 18, 2016

Related U.S. Application Data

(60) Provisional application No. 62/036,901, filed on Aug. 13, 2014.

(51) Int. Cl.
*H04W 72/12* (2009.01)
*H04B 1/3816* (2015.01)
(Continued)

(52) U.S. Cl.
CPC .......... *H04B 1/3816* (2013.01); *H04L 1/188* (2013.01); *H04L 1/1812* (2013.01);
(Continued)

(58) Field of Classification Search
CPC ..... H04L 1/1812; H04L 1/1877; H04L 1/188; H04W 28/0215; H04W 28/0278;
(Continued)

(56) References Cited

U.S. PATENT DOCUMENTS 6,819,676 B1 11/2004 Min
7,826,438 B1 11/2010 Salhotra et al.
(Continued)

FOREIGN PATENT DOCUMENTS

EP 2605562 A2 6/2013
GB 2492577 A 1/2013
(Continued)

OTHER PUBLICATIONS

International Search Report and Written Opinion—PCT/US2015/042255—ISA/EPO—dated Oct. 20, 2015.
(Continued)

*Primary Examiner* — Awet Haile
(74) *Attorney, Agent, or Firm* — The Marbury Law Group, PLLC

(57) ABSTRACT

Various embodiments implemented on a mobile communication device (e.g., a multi-SIM-multi-active communication device) mitigate degraded transmit performance typically experienced by a lower-priority subscription during a Tx collision event in which a higher-priority subscription receives a shared Tx resource of the mobile communication device to the exclusion of the lower-priority subscription. Specifically, in various embodiments, a processor of the mobile communication device may determine when an upcoming transmission of the lower-priority subscription will collide with a scheduled transmission of the higher-priority subscription (i.e., may determine when a Tx collision event will occur between the subscriptions) and may implement one or more Tx collision management strategies in response to determining that the lower-priority subscription's upcoming transmission will collide with a transmission of the higher-priority subscription, thus improving the lower-priority subscription's overall performance.

17 Claims, 17 Drawing Sheets

(51) Int. Cl.

| | | |
|---|---|---|
| *H04L 1/18* | (2006.01) | |
| *H04W 72/04* | (2009.01) | |
| *H04W 72/10* | (2009.01) | |
| *H04W 28/02* | (2009.01) | |
| *H04W 28/04* | (2009.01) | |
| *H04W 8/18* | (2009.01) | |
| *H04W 88/06* | (2009.01) | |

(52) U.S. Cl.
CPC .......... *H04L 1/1877* (2013.01); *H04W 8/183* (2013.01); *H04W 28/0215* (2013.01); *H04W 28/0278* (2013.01); *H04W 28/042* (2013.01); *H04W 72/042* (2013.01); *H04W 72/0453* (2013.01); *H04W 72/10* (2013.01); *H04W 72/1215* (2013.01); *H04W 72/1247* (2013.01); *H04W 88/06* (2013.01)

(58) Field of Classification Search
CPC ............. H04W 28/042; H04W 72/042; H04W 72/0453; H04W 72/10; H04W 72/1215; H04W 72/1247; H04W 88/06; H04W 8/183
See application file for complete search history.

(56) References Cited

U.S. PATENT DOCUMENTS

| | | | |
|---|---|---|---|
| 9,002,282 B1 | 4/2015 | De La Broise et al. | |
| 2001/0022806 A1 | 9/2001 | Adachi | |
| 2010/0284364 A1 | 11/2010 | You et al. | |
| 2010/0322165 A1* | 12/2010 | Yoo ...................... | H04L 1/1812 370/329 |
| 2012/0033628 A1 | 2/2012 | Eriksson et al. | |
| 2012/0071185 A1 | 3/2012 | Dayal et al. | |
| 2012/0087341 A1 | 4/2012 | Jang et al. | |
| 2013/0021982 A1 | 1/2013 | Kim et al. | |
| 2013/0028201 A1 | 1/2013 | Koo et al. | |
| 2013/0039198 A1 | 2/2013 | Isojima | |
| 2013/0150013 A1* | 6/2013 | Liu ...................... | H04W 8/183 455/418 |
| 2013/0176976 A1 | 7/2013 | Balakrishnan et al. | |
| 2013/0194994 A1 | 8/2013 | Dayal et al. | |
| 2013/0235814 A1 | 9/2013 | Wietfeldt et al. | |
| 2013/0242730 A1 | 9/2013 | Pelletier et al. | |
| 2013/0343273 A1 | 12/2013 | Barbieri et al. | |
| 2014/0056277 A1 | 2/2014 | Homchaudhuri et al. | |
| 2014/0128082 A1 | 5/2014 | Chirayil | |
| 2014/0199993 A1 | 7/2014 | Dhanda et al. | |
| 2014/0228070 A1 | 8/2014 | Josso et al. | |
| 2014/0269534 A1 | 9/2014 | Persson et al. | |
| 2015/0071088 A1 | 3/2015 | Gottimukkala et al. | |
| 2015/0189675 A1 | 7/2015 | Feuersaenger et al. | |
| 2015/0288503 A1 | 10/2015 | Earnshaw et al. | |
| 2016/0049976 A1 | 2/2016 | Krishnamoorthi | |
| 2016/0050664 A1 | 2/2016 | Krishnamoorthi | |
| 2016/0050686 A1 | 2/2016 | Krishnamoorthi | |
| 2017/0026985 A1* | 1/2017 | Lindoff ................. | H04L 1/0006 |

FOREIGN PATENT DOCUMENTS

| | | |
|---|---|---|
| GB | 2509071 A | 6/2014 |
| WO | 2007050231 A2 | 5/2007 |
| WO | 2009022813 A1 | 2/2009 |
| WO | 2009088858 A1 | 7/2009 |
| WO | 2009141490 A1 | 11/2009 |
| WO | 2011109750 A1 | 9/2011 |
| WO | 2014003327 A1 | 1/2014 |
| WO | 2014070101 A1 | 5/2014 |

OTHER PUBLICATIONS

"Types of TDM Solutions for LTE ISM Coexistence," 3GPP TSG-RAN WG2 Meeting #71-BIS, R2-105764, Oct. 11-15, 2010, 7 pages.

* cited by examiner

MANAGING TRANSMITTER COLLISIONS

RELATED APPLICATIONS

This application claims the benefit of priority to U.S. Provisional Patent Application No. 62/036,901 entitled "LTE Transmitter Sharing and Loss Mitigation" filed Aug. 13, 2014, the entire contents of which are incorporated herein by reference.

BACKGROUND

Some new designs of mobile communication devices—such as smart phones, tablet computers, and laptop computers—contain two or more Subscriber Identity Module ("SIM") cards that provide users with access to multiple separate mobile telephony networks. Examples of mobile telephony networks include Third Generation (3G), Fourth Generation (4G), Long Term Evolution (LTE), Time Division Multiple Access (TDMA), Frequency Division Multiple Access (FDMA), Code Division Multiple Access (CDMA), Wideband CDMA (WCDMA), Global System for Mobile Communications (GSM), and Universal Mobile Telecommunications Systems (UMTS). Example multi-SIM mobile communication devices include mobile phones, laptop computers, smart phones, and other mobile communication devices that are configured to connect to multiple mobile telephony networks. A mobile communication device that includes a plurality of SIMs and connects to two or more separate mobile telephony networks using two or more separate radio-frequency ("RF") transceivers is termed a "multi-SIM-multi-active" or "MSMA" communication device. An example MSMA communication device is a "dual-SIM-dual-active" or "DSDA" communication device, which includes two SIM cards/subscriptions associated with two mobile telephony networks.

Because a multi-SIM-multi-active communication device has a plurality of separate RF communication circuits or "RF resources," each subscription on the multi-SIM-multi-active communication device may use an associated RF resource to communicate with the subscription's mobile network at any time. However, in some circumstances, the multi-SIM-multi-active communication device may operate in a transmit-sharing ("Tx-sharing") mode in which two (or more) subscriptions share a single transmit ("Tx") resource (e.g., a transmitter or transceiver). While operating in a Tx-sharing mode, a first subscription (e.g., an LTE subscription) and a second subscription (e.g., a GSM subscription) cannot simultaneously utilize the shared Tx resource. As a result, the first subscription and/or the second subscription could experience degraded transmit performance in situations in which both subscriptions need to use the Tx resource at the same time, such as when both subscriptions are engaged in a data or voice call.

SUMMARY

The various embodiments include methods and mobile communication devices implementing methods for managing potential transmitter collisions of a first subscription. The various methods may include determining a first time at which a scheduling request (SR) transmission of the first subscription is scheduled to occur, determining a second time at which a packet transmission of the first subscription is scheduled to occur based on the first time, determining a transmission schedule of a second subscription during the second time, determining whether the packet transmission will collide with a transmission of the second subscription based on the transmission schedule of the second subscription, and implementing a transmit (Tx) collision management strategy for the first subscription in response to determining that the packet transmission of the first subscription will collide with the transmission of the second subscription. In various embodiments, the first subscription and the second subscription may be subscriptions to different radio access technologies.

In some embodiments, implementing the Tx collision management strategy for the first subscription in response to determining that the packet transmission of the first subscription will collide with the transmission of the second subscription may include preventing transmission of the SR transmission to a network of the first subscription in response to determining that the packet transmission will collide with a transmission of the second subscription. In some embodiments, the method may further include sending the SR transmission to the network of the first subscription in response to determining that the packet transmission will not collide with a transmission of the second subscription.

In some embodiments, implementing the Tx collision management strategy for the first subscription in response to determining that the packet transmission of the first subscription will collide with the transmission of the second subscription may include determining whether a threshold number of previously skipped SR transmissions has been reached in response to determining that the packet transmission will collide with the transmission of the second subscription, preventing transmission of the SR transmission to a network of the first subscription in response to determining that the threshold number of previously skipped SR transmissions has not been reached, and sending the SR transmission to the network of the first subscription in response to determining that the threshold number of previously skipped SR transmissions has been reached.

In some embodiments, implementing the Tx collision management strategy for the first subscription in response to determining that the packet transmission of the first subscription will collide with the transmission of the second subscription may include determining whether a threshold period of time has elapsed since a previous SR transmission was sent to a network of the first subscription, preventing transmission of the SR transmission to the network of the first subscription in response to determining that the threshold period of time has not elapsed since a previous SR transmission was sent to a network of the first subscription, and sending the SR transmission to the network of the first subscription in response to determining that the threshold period of time has elapsed since a previous SR transmission was sent to a network of the first subscription.

In some embodiments, the SR transmission may cause a network of the first subscription to schedule an uplink grant for the packet transmission. In some embodiments, the first subscription may have a lower priority than the second subscription. In some embodiments, the first subscription may be engaged in a data call and the second subscription may be engaged in a voice call.

Various embodiments further include a mobile computing device having a memory, a radio frequency (RF) resource, and a processor coupled to the memory and the RF resource and configured with processor executable instructions to perform operations of the methods described above. Various embodiments include a mobile computing device having means for performing functions of the methods described above. Various embodiments include a non-transitory processor-readable storage medium having stored thereon processor-executable instructions configured to cause a processor of a mobile computing device to perform operations of the methods described above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
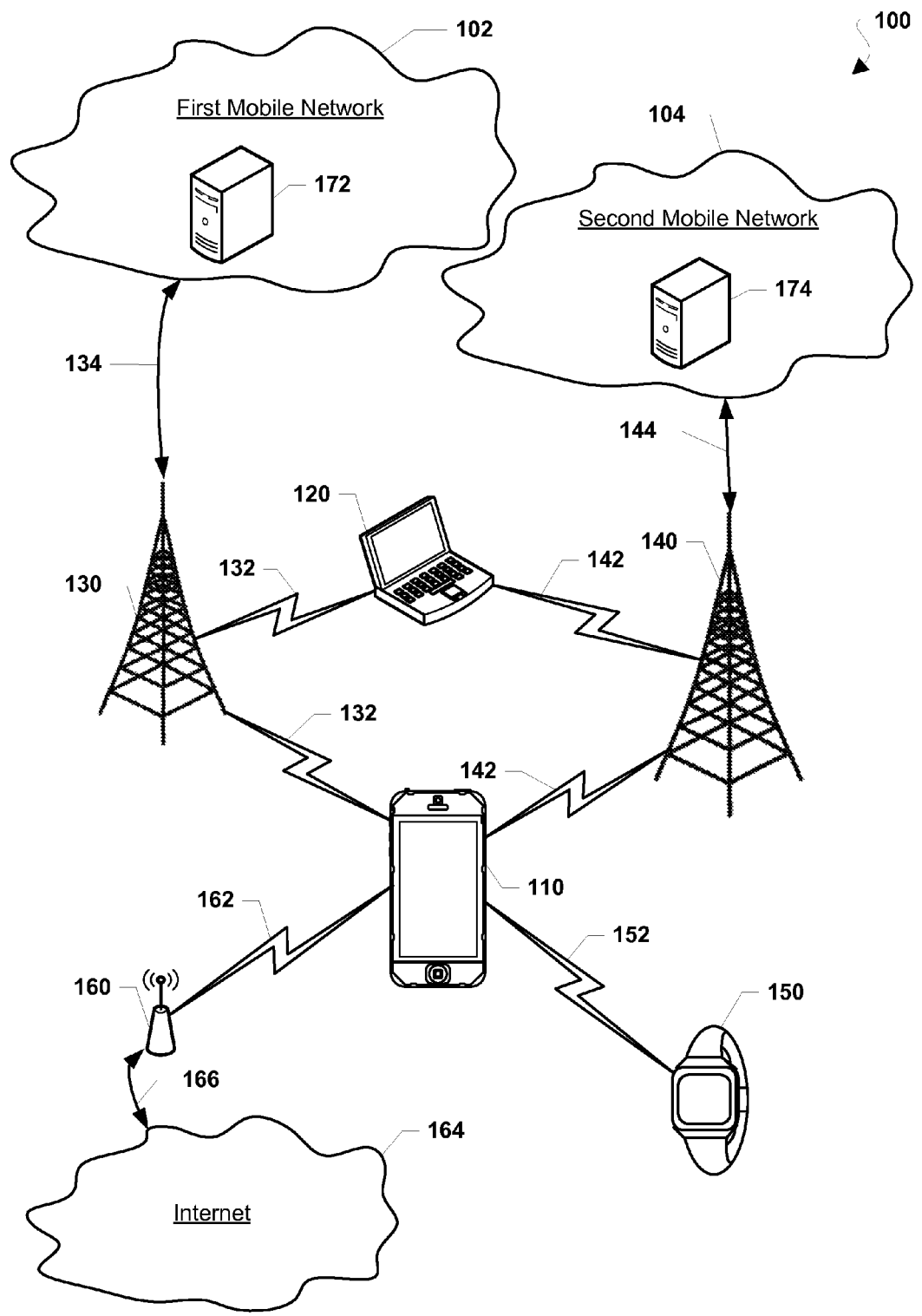
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the terms "wireless device," "mobile communication device," and "multi-SIM-multi-active communication device" are used interchangeably and refer to any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices that include a programmable processor, memory, and circuitry for connecting to at least two mobile communication networks. The various aspects may be useful in mobile communication devices, such as smart phones, and so such devices are referred to in the descriptions of various embodiments. However, the embodiments may be useful in any electronic devices, such as a DSDA communication device, that may individually maintain a plurality of subscriptions that utilize a plurality of separate RF resources and may operate in a Tx-sharing mode in which two (or more) subscriptions share a single Tx resource.

As used herein, the terms "SIM," "SIM card," and "Subscriber Identification Module" are used interchangeably to refer to a memory that may be an integrated circuit or embedded into a removable card, and that stores an International Mobile Subscriber Identity (IMSI), related key, and/or other information used to identify and/or authenticate a mobile communication device on a network and enable a communication service with the network. Because the information stored in a SIM enables the mobile communication device to establish a communication link for a particular communication service with a particular network, the term "subscription" is also be used herein as a shorthand reference to the communication service associated with and enabled by the information stored in a particular SIM as the SIM and the communication network, as well as the services and subscriptions supported by that network, correlate to one another.

As described, while a mobile communication device is operating in a Tx-sharing mode, a first subscription (e.g., a subscription to an LTE network or an "LTE subscription") and a second subscription (e.g., a subscription to a GSM network or a "GSM subscription") share a single Tx resource. In situations in which both subscriptions are in active states (i.e., handling voice or data calls), the first subscription and the second subscription may need to simultaneously utilize the shared Tx resource, for example, to service calls. In conventional mobile communication devices capable of Tx-sharing mode, a priority scheme is typically used to determine one of the first and the second subscriptions that will receive access to the shared Tx resource in the event that both subscriptions simultaneously require access to the shared Tx resource. For example, a GSM subscription engaged in a voice call will have priority over an LTE subscription engaged in a data call, and thus, when both subscriptions require access to the shared Tx resource (i.e., during a "transmission" or "Tx" collision event), the GSM subscription receives access to the shared Tx resource and the LTE subscription is denied access to the shared Tx resources. As a result, the lower-priority LTE subscription's transmission during the Tx collision event may be partially or completely lost in favor of the higher-priority GSM subscription's transmissions, thereby potentially degrading the lower-priority subscription's Tx performance.

In overview, various embodiments implemented on a mobile communication device (e.g., a multi-SIM-multi-active communication device) mitigate the degraded transmit performance typically experienced by a lower-priority subscription during a Tx collision event. In various embodiments, a processor of the mobile communication device may determine when an upcoming transmission of the lower-priority subscription will collide with a transmission of a higher-priority subscription (i.e., may determine when a Tx collision event will occur between the subscriptions) and implement one or more Tx collision management strategies for the lower-priority subscription in response to determining that the lower-priority subscription's upcoming transmission will collide with a transmission of the higher-priority subscription, thus improving the lower-priority subscription's overall performance.

For ease of reference, a lower-priority subscription (e.g., a subscription engaged in a data call) may be referred to herein as a "first subscription," and a higher-priority subscription (e.g., a subscription engaged in a voice call) may be referred to as a "second subscription." However, because the priorities of subscriptions may change over time, a first subscription at a first time may be a second subscription at a second time, and a second subscription at the first time may be a first subscription at some other time. Thus, these references are merely for ease of description and not intended to imply or require a particular subscription to always be either a first or second subscription.

In some embodiments, the device processor may manage a potential Tx collision by implementing a Tx collision management strategy for the first subscription by rescheduling the first subscription's upcoming scheduling request ("SR") transmissions in the event that the device processor determines that packet transmissions associated with the upcoming SR transmissions will collide with a transmission of the second subscription.

In some embodiments, the device processor may manage a potential Tx collision by implementing a Tx collision management strategy for the first subscription by skipping/ignoring uplink grants received from the network that are associated with packet transmissions that will collide with a transmission of the second subscription. In such embodiments, the device processor may receive other uplink grants associated with other packet transmissions and may wait to send high-priority messages as part of a packet transmission that will not collide with a transmission of the second subscription.

In some embodiments, the device processor may manage a potential Tx collision by implementing a Tx collision management strategy for the first subscription by immediately initiating a radio-link-control-level (RLC-level) retransmission operation in response to determining that one or more attempts to transmit (or retransmit) a packet have failed at a hybrid-automatic-repeat-request (HARQ) level because of a Tx collision with the second subscription's transmissions. In such embodiments, the device processor may ignore HARQ-level packet transmissions/retransmissions that have failed due to a Tx collision with the second subscription, and thus may not update an RLC-level retransmission counter used to determine when the link with the first subscription's network is lost.

In some embodiments, the device processor may manage a potential Tx collision by implementing a Tx collision management strategy for the first subscription by sending an artificially inflated buffer size report (BSR) to the first subscription's network, which may cause the first subscription's network to send a plurality of uplink grants to the mobile communication device. In such embodiments, the device processor may analyze each uplink grant received from the first subscription's network, identify one or more of a plurality of uplink grants that are associated with a packet transmission that does not collide with a transmission of the second subscription, and send data to the first subscription's network via a non-colliding packet transmission based on the one or more identified uplink grants.

In some embodiments, the device processor may manage a potential Tx collision by implementing a Tx collision management strategy for the first subscription in response to determining that an upcoming transmission of the first subscription will collide with a transmission of the second subscription by determining the current radio conditions for the first subscription and adjusting the priority of the first subscription's upcoming transmission based on the current radio conditions of the first subscription. Specifically, the device processor may increase the priority of the first subscription's upcoming transmission in response to determining that the current radio conditions of the first subscription are poor or do not satisfy a minimum quality threshold, which may indicate that the first subscription may need to immediately communicate with the subscription's network to initiate a handover to a base station/cell that may provide better service and/or radio conditions. In another example, the device processor may decrease the priority of the first subscription's upcoming transmission in response to determining that the current radio conditions of the first subscription are acceptable or satisfy a minimum quality threshold because the first subscription may not need to immediately communicate with the subscriptions network to prevent a dropped call or lost connection.

Various embodiments may be implemented within a variety of communication systems 100 that include at least two mobile telephony networks, an example of which is illustrated in FIG. 1. A first mobile network 102 and a second mobile network 104 typically each include a plurality of cellular base stations (e.g., a first base station 130 and a second base station 140). A first mobile communication device 110 may be in communication with the first mobile network 102 through a cellular connection 132 to the first base station 130. The first mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second mobile communication device 120 may similarly communicate with the first mobile network 102 through the cellular connection 132 to the first base station 130. The second mobile communication device 120 may communicate with the second mobile network 104 through the cellular connection 142 to the second base station 140. The cellular connections 132 and 142 may be made through two-way wireless communication links, such as LTE, 4G, 3G, CDMA, TDMA, WCDMA, GSM, and other mobile telephony communication technologies.

While the mobile communication devices 110, 120 are shown connected to the mobile networks 102, 104, in some embodiments (not shown), the mobile communication devices 110, 120 may include one or more subscriptions to two or more mobile networks 102, 104 and may connect to those networks in a manner similar to the described operations.

In some embodiments, the first mobile communication device 110 may establish a wireless connection 152 with a peripheral device 150 used in connection with the first mobile communication device 110. For example, the first mobile communication device 110 may communicate over a Bluetooth® link with a Bluetooth-enabled personal computing device (e.g., a "smart watch"). In some embodiments, the first mobile communication device 110 may establish a wireless connection 162 with a wireless access point 160, such as over a Wi-Fi connection. The wireless access point 160 may be configured to connect to the Internet 164 or another network over a wired connection 166.

While not illustrated, the second mobile communication device 120 may similarly be configured to connect with the peripheral device 150 and/or the wireless access point 160 over wireless links.

In some embodiments, the first mobile network 102 and the second mobile network 104 may individually include at least one server (e.g., a server 172 and a server 174, respectively) that may be configured to allocate and/or adjust resource grants (e.g., uplink grants) for subscriptions on the mobile communication devices 110, 120.

Figure 2:
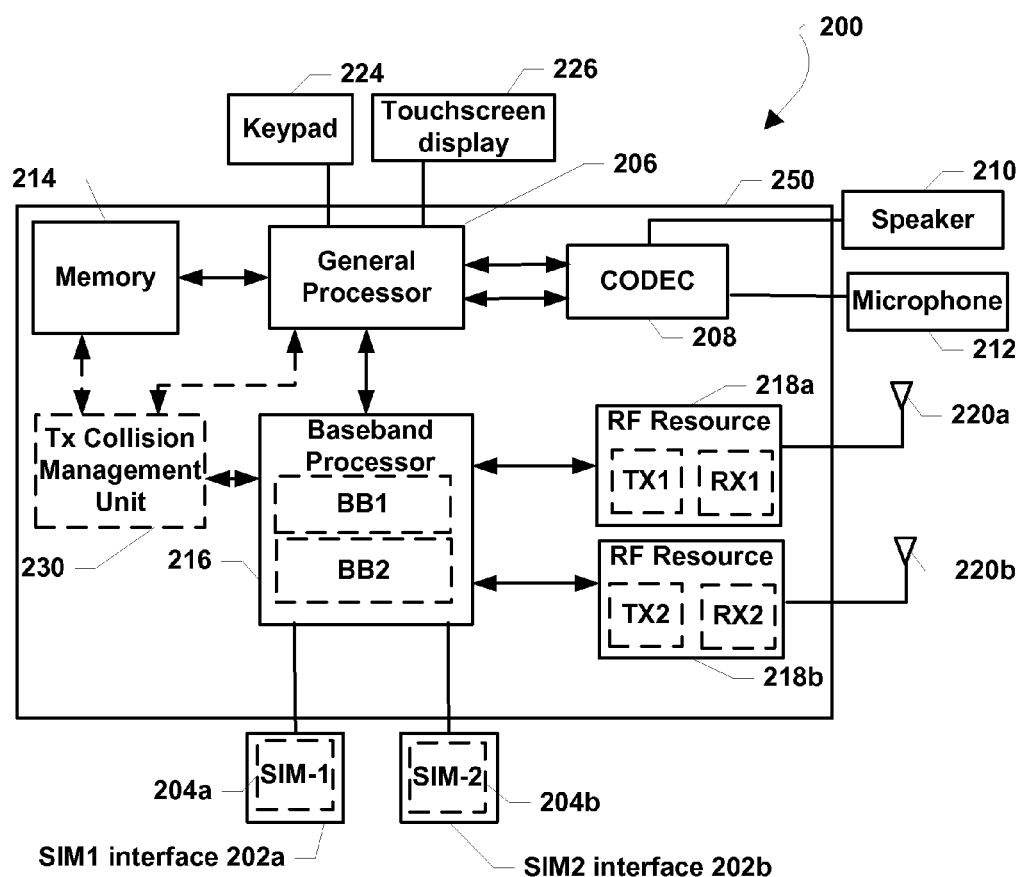
FIG. 2 is a component block diagram of a multi-SIM-multi-active communication device according to various embodiments.

FIG. 2 is a functional block diagram of a mobile communication device 200 suitable for implementing various embodiments. With reference to FIGS. 1-2, the mobile communication device 200 may be similar to one or more of the mobile communication devices 110, 120 as described. The mobile communication device 200 may include a first SIM interface 202a, which may receive a first identity module SIM-1 204a that is associated with a first subscription (e.g., a subscription to an LTE network). The mobile communication device 200 may also include a second SIM interface 202b, which may receive a second identity module SIM-2 204b that is associated with a second subscription (e.g., a subscription to a GSM network).

A SIM in various embodiments may be a Universal Integrated Circuit Card (UICC) that is configured with SIM and/or Universal SIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a central processing unit (CPU), read only memory (ROM), random access memory (RAM), electrically erasable programmable read only memory (EEPROM) and input/out (I/O) circuits.

A SIM used in various embodiments may include user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home Public Land Mobile Number (HPLMN) code, etc.) to indicate the SIM card network operator provider. An Integrated Circuit Card Identity (IC-CID) SIM serial number is printed on the SIM card for identification. However, a SIM may be implemented within a portion of memory of the mobile communication device 200 (e.g., memory 214), and thus need not be a separate or removable circuit, chip or card.

The mobile communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to the memory 214. The memory 214 may be a non-transitory computer readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure. In some embodiments, the memory 214 may also store one or more look-up tables, lists, or various other data structures that may be referenced to determine schedules of upcoming transmissions of the first subscription and/or the second subscription.

The general-purpose processor 206 and the memory 214 may each be coupled to at least one baseband modem processor 216. Each SIM in the mobile communication device 200 (e.g., the SIM-1 204a and the SIM-2 204b) may be associated with a baseband-RF resource chain. The baseband-RF resource chain may include the baseband modem processor 216, which may perform baseband/modem functions for communicating with/controlling a radio access technology (RAT), and may include one or more amplifiers and radios, referred to generally herein as RF resources (e.g., RF resources 218a, 218b). In some embodiments, baseband-RF resource chains may share the baseband modem processor 216 (i.e., a single device that performs baseband/modem functions for all SIMs on the mobile communication device 200). In other embodiments, each baseband-RF resource chain may include physically or logically separate baseband processors (e.g., BB1, BB2).

In some embodiments, the RF resources 218a, 218b may be associated with different SIMs/subscriptions. For example, a first subscription to an LTE network may be associated with the RF resource 218a, and a second subscription to a GSM network may be associated with the RF resource 218b. The RF resources 218a, 218b may each be transceivers that perform transmit/receive functions on behalf of subscriptions/SIMs assigned to each RF resource. The RF resources 218a, 218b may also include separate transmit and receive circuitry, or may include a transceiver that combines transmitter and receiver functions. The RF resources 218a, 218b may each be coupled to a wireless antenna (e.g., a first wireless antenna 220a or a second wireless antenna 220b). The RF resources 218a, 218b may also be coupled to the baseband modem processor 216.

In some embodiments, the mobile communication device 200 may operate in a Tx-sharing mode in which a plurality of subscriptions utilize a shared Tx resource, such as by sharing the transmit functions of the RF resource 218a or the RF resource 218b. In such embodiments, a processor or the mobile communication device (e.g., the general-purpose processor 206, the baseband modem processor 216, and or a Tx collision management unit 230) may allocate the shared Tx resource to one of the plurality of subscriptions during a Tx collision event. In some embodiments, the processor(s) may allocate the shared Tx resource to a subscription in the plurality of subscriptions based on that subscription's priority. For example, the processor(s) may allocate the shared Tx resource to a GSM subscription engaged in a voice call instead of an LTE subscription engaged in a data call.

In some embodiments, the general-purpose processor 206, the memory 214, the baseband processor(s) 216, and the RF resources 218a, 218b may be included in the mobile communication device 200 as a system-on-chip 250. In some embodiments, the first and second SIMs 204a, 204b and their corresponding interfaces 202a, 202b may be external to the system-on-chip 250. Further, various input and output devices may be coupled to components on the system-on-chip 250, such as interfaces or controllers. Example user input components suitable for use in the mobile communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or receive a telephone number. As another example, the request to initiate the outgoing call may be in the form of a voice command received via the microphone 212. Interfaces may be provided between the various software modules and functions in the mobile communication device 200 to enable communication between them, as is known in the art.

Functioning together, the two SIMs 204a, 204b, the baseband modem processor 216, the RF resources 218a, 218b, and the wireless antennas 220a, 220b may constitute two or more RATs. For example, a SIM, baseband processor, and RF resource may be configured to support a GSM RAT, an LTE RAT, and/or a WCDMA RAT. More RATs may be supported on the mobile communication device 200 by adding more SIM cards, SIM interfaces, RF resources, and/or antennae for connecting to additional mobile networks.

In some embodiments, the Tx collision management unit 230 may be configured to manage and/or schedule subscriptions' utilization of a shared Tx resource, such as by adjusting a first subscription's transmission schedule to avoid a second subscription's scheduled transmissions during a Tx collision event. In some embodiments, the Tx collision management unit 230 may be implemented within the general-purpose processor 206. In some embodiments, the Tx collision management unit 230 may be implemented as a separate hardware component (i.e., separate from the general-purpose processor 206). In some embodiments, the Tx collision management unit 230 may be implemented as a software application stored within the memory 214 and executed by the general-purpose processor 206.

Figure 3:
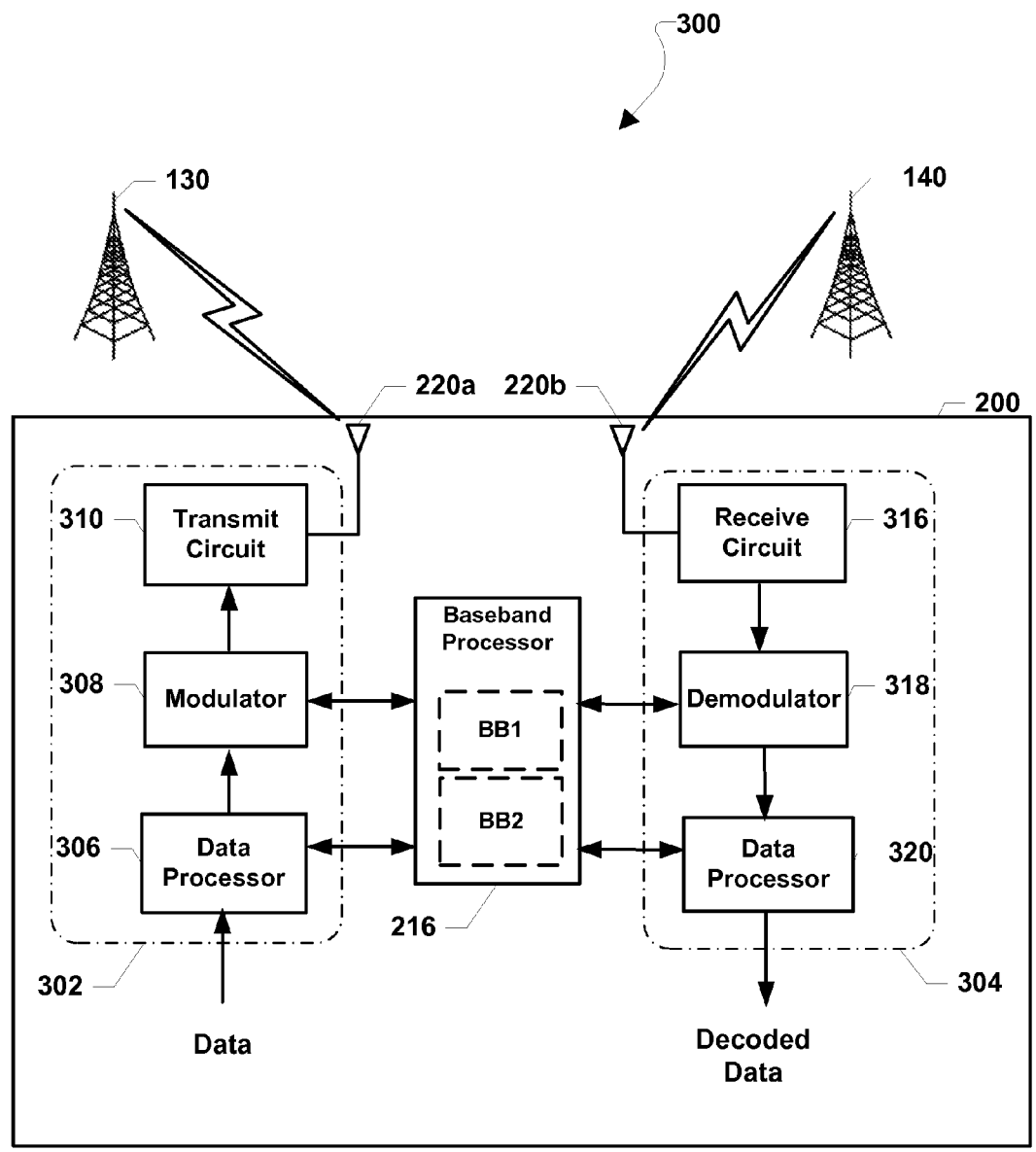
FIG. 3 is a component block diagram illustrating components of different transmit/receive chains in a multi-SIM-multi-active communication device according to various embodiments.

FIG. 3 is a block diagram 300 of transmit and receive components in separate RF resources on the mobile communication device 200 described with reference to FIG. 2, according to various embodiments. With reference to FIGS. 1-3, a transmitter 302 may be part of the RF resource 218a, and a receiver 304 may be part of the RF resource 218b. In some embodiments, the transmitter 302 may include a data processor 306 that may format, encode, and interleave data to be transmitted. The transmitter 302 may include a modulator 308 that modulates a carrier signal with encoded data, such as by performing Gaussian minimum shift keying (GMSK). One or more transmit circuits 310 may condition the modulated signal (e.g., by filtering, amplifying, and upconverting) to generate an RF modulated signal for transmission. The RF modulated signal may be transmitted by the transmitter 302 to the first base station 130 via the first wireless antenna 220a, for example.

The second wireless antenna 220b may receive RF modulated signals from the second base station 140 on the second wireless antenna 220b and pass the received signals to the receiver 304. One or more receive circuits 316 may condition (e.g., filter, amplify, and downconvert) the received RF modulated signal, digitize the conditioned signal, and provide samples to a demodulator 318. The demodulator 318 may extract the original information-bearing signal from the modulated carrier wave, and may provide the demodulated signal to a data processor 320. The data processor 320 may de-interleave and decode the signal to obtain the original, decoded data, and may provide decoded data to other components in the mobile communication device 200. Operations of the transmitter 302 and the receiver 304 may be controlled by a processor, such as the baseband modem processor 216.

In various embodiments, each of the transmitter 302 and the receiver 304 may be implemented as circuitry that may be separated from corresponding receive and transmit circuitries (not shown). Alternatively, the transmitter 302 and the receiver 304 may be respectively combined with corresponding receive circuitry and transmit circuitry, for example, as transceivers associated with the SIM-1 204a and the SIM-2 204b.

As described, mobile communication devices that implement Tx sharing (e.g., to reduce hardware costs) require two (or more) subscriptions to share a Tx resource. As the transmission schedules of these subscriptions occasionally overlap/collide—for example, when each of the subscriptions is in a connected mode (e.g., handling a voice or data call)—these subscriptions may compete for access to the shared Tx resource during Tx collision events. As a subscription having a higher/highest priority typically receives access to the shared Tx resource to the exclusion of a lower-priority subscription, the lower-priority subscription is unable to use the shared Tx resource to communicate with the lower-priority subscription's network while the higher-priority subscription is transmitting. This causes the lower-priority subscription to drop data packets and, potentially, causes the lower-priority subscription to lose a connection to the subscription's network. Thus, various embodiments relate to implementing one or more Tx collision management strategies to mitigate the effects of Tx collision events on the transmission performance of lower-priority subscriptions.

Figure 4:
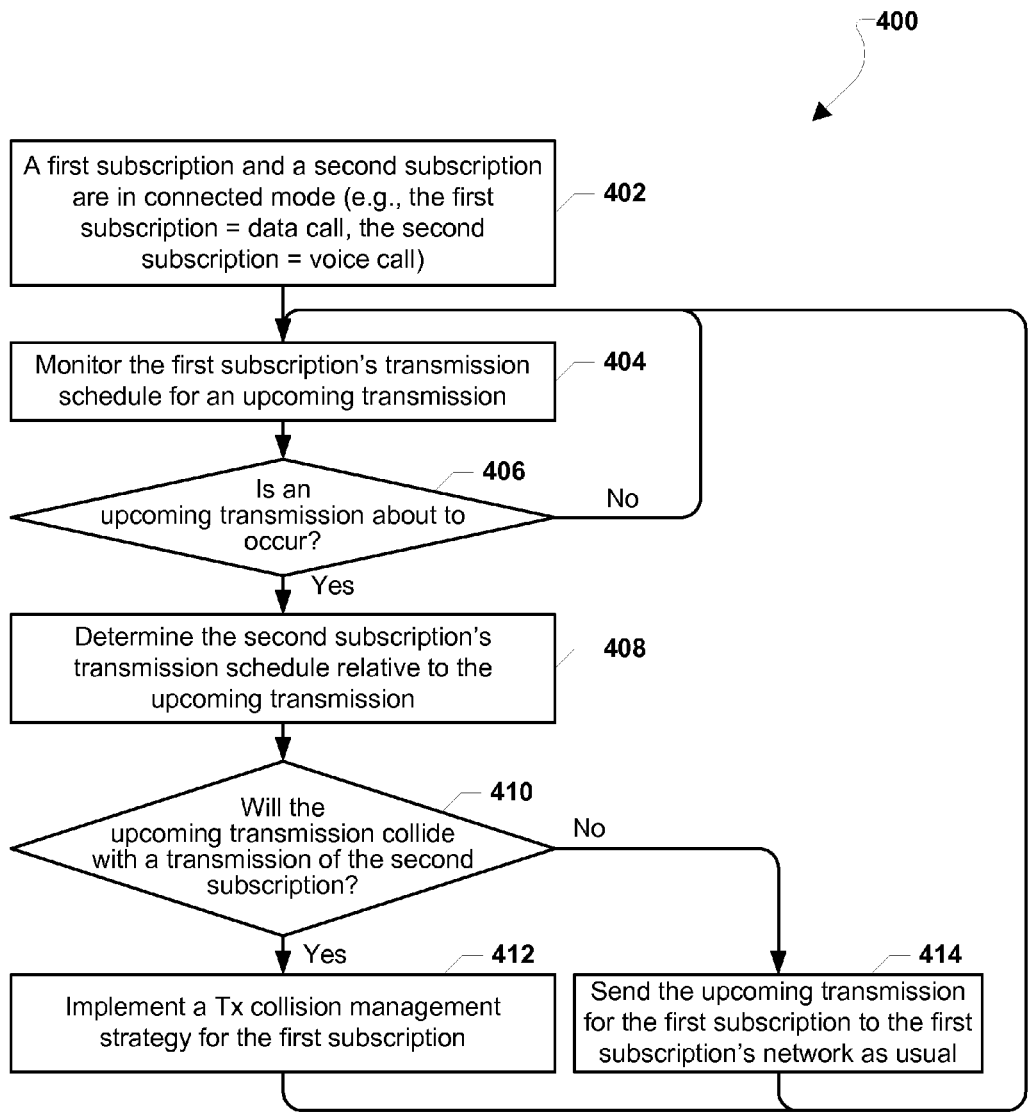
FIG. 4 is a process flow diagram illustrating a method for managing potential transmitter collisions of a first subscription according to various embodiments.

FIG. 4 illustrates a method 400 for managing one or more potential transmitter collisions by implementing a Tx collision management strategy for a lower-priority subscription (i.e., a first subscription), such as a data call, in response to determining that an upcoming transmission of the first subscription will collide with a transmission of a higher-priority subscription (i.e., a second subscription), such as a voice call, during a Tx collision event. With reference to FIGS. 1-4, the method 400 may be implemented with a processor (e.g., the general-purpose processor 206, the baseband modem processor 216, the Tx collision management unit 230, a separate controller, and/or the like) of a multi-SIM-multi-active communication device (e.g., the mobile communication device 200). In some embodiments, the mobile communication device may be operating in a Tx-sharing mode such that the first subscription and the second subscription utilize a shared Tx resource (e.g., 218*a* or 218*b*).

In block 402, a first subscription and a second subscription may be in a connected mode, such as when the first subscription is engaged in a data call and the second subscription is engaged in a voice call. In some embodiments, servicing a voice call may have priority over servicing a data call to ensure that the mobile communication device provides high-quality, reliable voice calls. Thus, the second subscription's transmissions may have priority over the transmissions of the first subscription.

While the first and second subscriptions are operating in a connected/active mode, the device processor may monitor the first subscription's transmission schedule for an upcoming transmission, in block 404. Then the device processor may determine whether an upcoming transmission for the first subscription is about to occur, in determination block 406. The device processor may continue monitoring the first subscription's transmission schedule so long as an upcoming transmission for the first subscription is not about to occur (i.e., while determination block 406="No"). In some embodiments, the device processor may access the first subscription's transmission schedule from memory (e.g., the memory 214), retrieve the transmission schedule from the first subscription, and/or obtain the transmission schedule from the first subscription's network. In such embodiments, the device processor may reference the first subscription's transmission schedule to determine whether the first subscription is about to transmit. In some embodiments, the device processor may additionally (or alternatively) determine the first subscription's transmission schedule based on patterns in the first subscription transmission history.

In response to determining that an upcoming transmission of the first subscription is about to occur (i.e., determination block 406="Yes"), the device processor may determine the second subscription's transmission schedule relative to the upcoming transmission of the first subscription, in block 408. In some embodiments, the device processor may access or obtain the transmission schedule of the second subscription by performing operations similar to those described with reference to blocks 404-406.

In determination block 410, the device processor may determine whether the upcoming transmission of the first subscription will collide with a transmission of the second subscription. In other words, the device processor may determine whether a Tx collision event (i.e., one or more potential collisions) is expected to occur between the first and second subscriptions based on transmission schedules of each subscription. For example, the device processor may determine whether at least one transmission of the first subscription will coincide/overlap with a transmission of the second subscription, which may indicate that the first subscription may be unable to access the shared Tx resource because the second subscription, as a higher-priority subscription, may receive sole access to the shared Tx resource to the exclusion of the first subscription.

In response to determining that the upcoming transmission of the first subscription will not collide with the transmission of the second subscription (i.e., determination block 410="No"), the device processor may send the upcoming transmission for the first subscription to the first subscription's network as usual, in block 414. In other words, in response to determining that there will be no Tx collision event between the first subscription and the second subscription, the device processor and/or various other components on the mobile communication device may enable the first subscription to transmit the upcoming transmission to the first subscription's network as usual and without interruption.

In response to determining that the upcoming transmission of the first subscription will collide with the transmission of the second subscription (i.e., determination block 410="Yes"), the device processor may implement a Tx collision management strategy for the first subscription, in block 412. In some embodiments, the Tx collision management strategy may reduce the impact of the loss of access to the shared Tx resource during the first subscriptions upcoming transmission.

Figure 5:
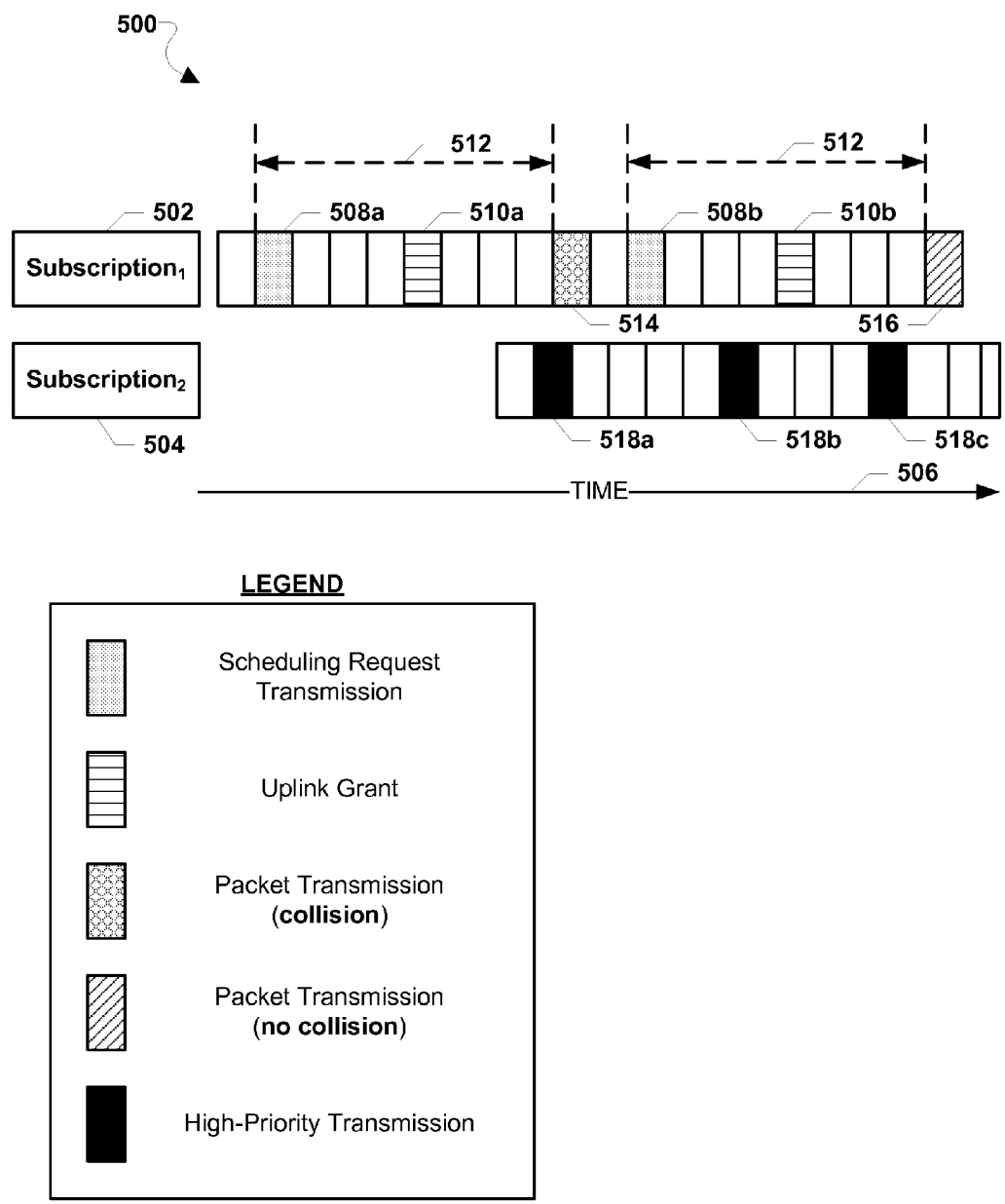
FIG. 5 is a timeline diagram illustrating transmission schedules of a first subscription and a second subscription according to various embodiments.
Figure 6:
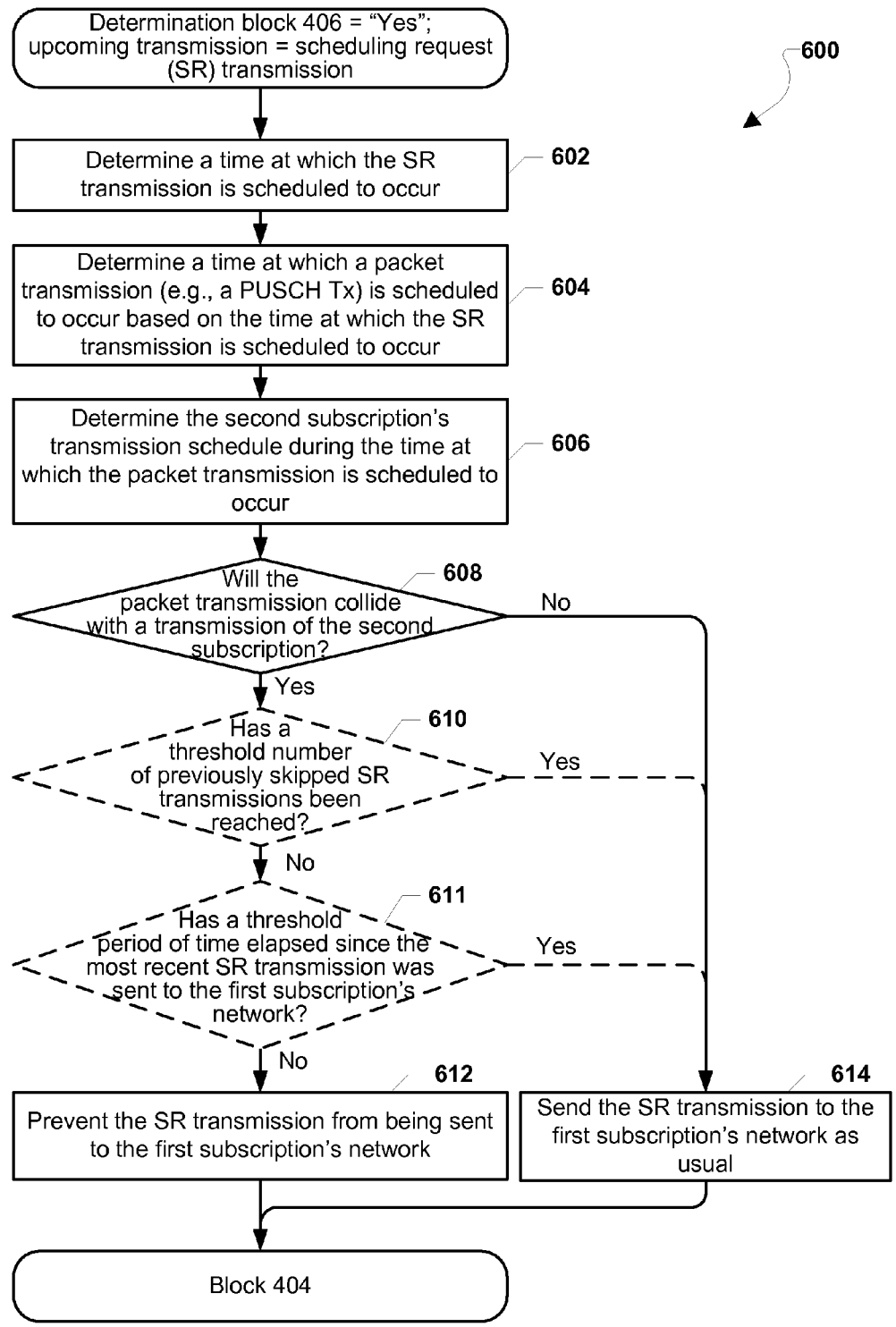
FIG. 6 is a process flow diagram illustrating a method for preventing a scheduling-request transmission to a network of a first subscription in response to determining that a packet transmission associated with the scheduling-request transmission will collide with a transmission of a second subscription according to various embodiments.

In some embodiments of the operations performed in block 412, the device processor may reschedule upcoming scheduling request ("SR") transmissions associated with Physical Uplink Shared Channel ("PUSCH") transmissions (herein referred to as "packet" transmissions) in the event that the device processor determines that the packet transmissions associated with the upcoming SR transmissions will collide with a transmission of the second subscription (see, e.g., FIGS. 5-6).

In some embodiments, the device processor may implement a Tx collision management strategy for the first subscription by skipping/ignoring uplink grants received from the network that are associated with packet transmissions that the device processor determines will collide with a transmission of the second subscription (see, e.g., FIGS. 7-9B). In such embodiments, the device processor may wait to send high-priority messages as part of a packet transmission associated with a new uplink grant received from the first subscription's network that will not collide with a transmission of the second subscription.

In some embodiments, the device processor may implement a Tx collision management strategy for the first subscription in block 412 by immediately initiating a radio-link-control-level (RLC-level) retransmission operation in response to determining that one or more attempts to transmit (or retransmit) a packet have failed at the hybrid-automatic-repeat-request (HARQ) level. In such embodiments, the device processor may not account for HARQ-level packet transmissions/retransmissions that failed due to a Tx collision with the second subscription, and thus may not update a RLC-level retransmission counter used to determine when the link with the first subscription's network is lost (i.e., a radio link failure) (see, e.g., FIGS. 10-11).

In some embodiments, the device processor may implement a Tx collision management strategy for the first subscription in block 412 by sending an artificially inflated buffer size report (BSR) to the first subscription's network, which may cause the network to send a plurality of uplink grants to the mobile communication device for use by the first subscription. In such embodiments, the device processor may analyze each uplink grant received from the first subscription's network, identify one or more of plurality of uplink grants that are associated with a packet transmission that does not collide with a transmission of the second subscription (i.e., avoids a Tx collision event), and send data via a non-colliding packet transmission based on the one or more identified uplink grants (see, e.g., FIGS. 12-13).

Figure 14:
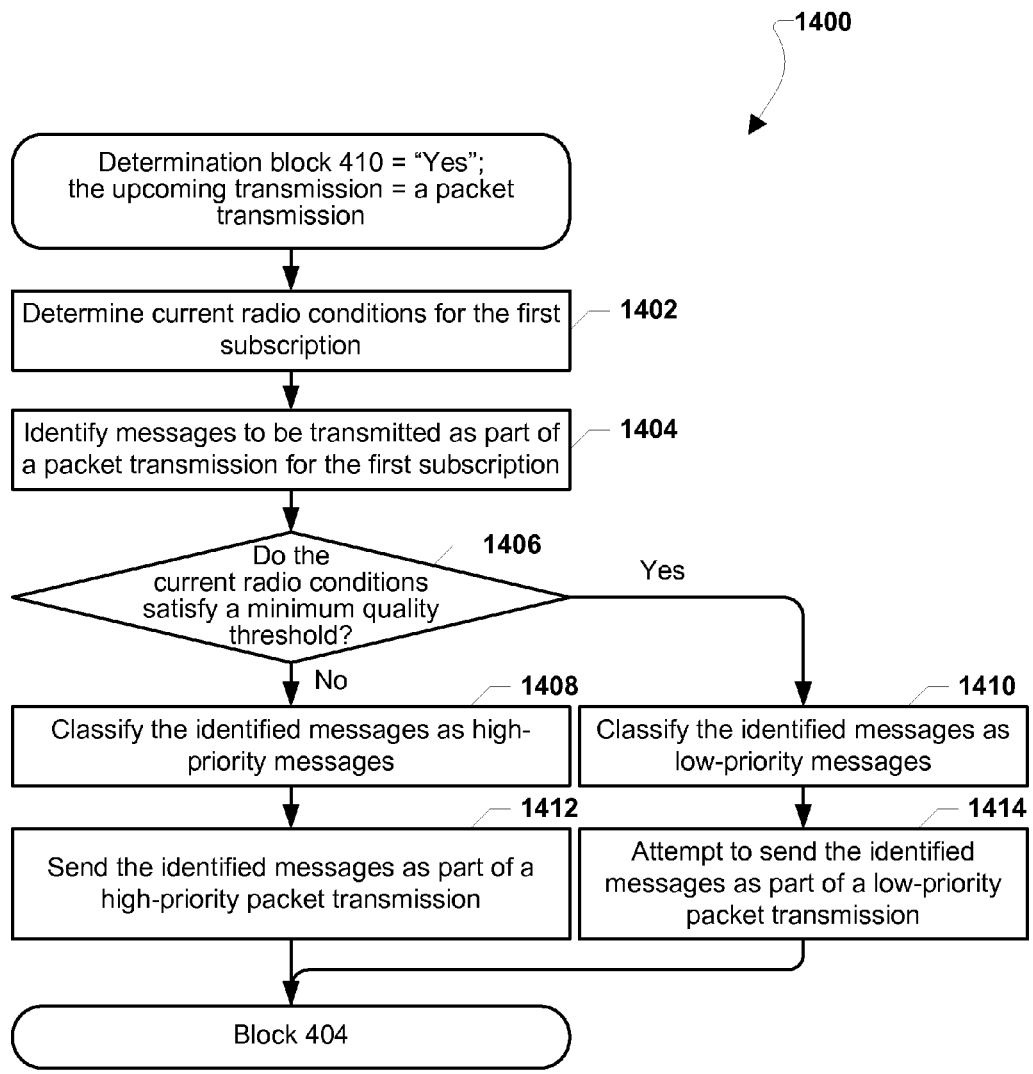
FIG. 14 is a process flow diagram illustrating a method for classifying the priority of messages of the first subscription based on the current radio conditions of the first subscription according to various embodiments.

In some embodiments of the operations performed in block 412, the device processor may implement a Tx collision management strategy for the first subscription in response to determining that an upcoming transmission of the first subscription will collide with a transmission of the second subscription by determining the current radio conditions for the first subscription and adjusting the priority of the first subscription's upcoming transmission based on the current radio conditions of the first subscription (see, e.g., FIG. 14). For example, the device processor may increase the priority of the first subscription's upcoming transmission in response to determining that the current radio conditions of the first subscription are poor or do not satisfy a minimum quality threshold, indicating that the first subscription may need to communicate with the subscription's network to initiate handover to a better base station/cell that may provide better radio conditions. In another example, the device processor may decrease the priority of the first subscription's upcoming transmission in response to determining that the current radio conditions of the first subscription are good or satisfy a minimum quality threshold because the first subscription may not need to immediately communicate with the subscription's network to prevent a dropped call or lost connection.

In response to implementing a Tx collision management strategy for the first subscription in block 412 or sending the upcoming transmission for the first subscription to the first subscription's network in block 414, the device processor may repeat the operations of the method 400 by again monitoring the first subscription's transmission schedule for another upcoming transmission in block 404.

In some embodiments (not shown), the device processor may repeat the operations of the method 400 so long as both the first subscription and the second subscription are in an active/connected mode or while there is a possibility of a Tx collision event occurring between the first subscription and the second subscription.

FIG. 5 is a timeline diagram 500 illustrating transmission schedules of a first subscription 502 (i.e., "subscription$_1$") and a second subscription 504 (i.e., "subscription") over time 506 while the subscriptions 502, 504 are in a connected mode and sharing a single Tx resource. In various embodiments and for ease of description, the first subscription 502 may be considered as having a lower-priority than the priority of the second subscription 504, as described. As such, the first subscription 502 may be prevented from utilizing a shared Tx resource in the event that transmissions of the first subscription 502 collide with transmission of the second subscription 504 because the first subscription 502 has a lower priority than the priority of the second subscription 504.

With reference to FIGS. 1-5, the first subscription 502 may periodically send SR transmissions (e.g., SR transmissions 508a, 508b) to the first subscription's network via a control channel. In some embodiments, the first subscription 502 may use SR transmissions to request uplink resource allocations (i.e., uplink resource grants) from the first subscription's network, and in response to receiving the SR transmission, the network of the first subscription 502 may send one or more uplink grants (e.g., uplink grants 510a, 510b) to the first subscription 502 that designate a scheduled time during which the first subscription 502 may transmit a data packet(s) to the network via a PUSCH/packet transmission (e.g., packet transmissions 514, 516).

In various embodiments, the first subscription 502 may communicate with the first subscription's network based on a predetermined schedule. For example, the first subscription 502 may be configured to send SR transmissions periodically, receive uplink grants corresponding to those SR transmissions at an expected time, and send packet transmissions at a predetermined time based on the received plurality of uplink grants. In other words, because the first subscription 502 and the network of the first subscription 502 communicate with each other based on a predetermined schedule, a device processor on the mobile communication device (not shown) may anticipate a time at which the first subscription 502 will send a packet transmission based on the time at which the first subscription 502 sends the preceding SR transmission associated with that packet transmission.

In some embodiments, the device processor may access information regarding the transmission schedule of the first subscription 502 to determine the predetermined time between an SR transmission and the SR transmission's corresponding packet transmission. For example, as illustrated in the timeline diagram 500, the device processor may determine that the packet transmission 514 of the first subscription 502 will begin a predetermined amount of time 512 after the beginning of the SR transmission 508a. Similarly, the device processor may determine that the first subscription 502 will attempt to send the packet transmission 516 after the predetermined amount of time 512 after the first subscription 502 begins to send the SR transmission 508b.

In some embodiments, the device processor may have access to (and/or may determine) a transmission schedule of the second subscription 504, as described (e.g., the method 400). For example, the device processor may determine that the second subscription 504 is scheduled to periodically broadcast high-priority (e.g., voice) transmissions 518a-518c.

Thus, because the device processor may access and/or determine the transmission schedules of both the first subscription 502 and the second subscription 504, the device processor may preemptively determine whether an SR transmission of the first subscription 502 may ultimately result in an attempt by the first subscription 502 to send a packet transmission at the same time that the second subscription 504 is scheduled to send a high-priority transmission that may prevent the first subscription 502 from sending the packet transmission (i.e., whether there will be a Tx collision event between the first subscription 502 and the second subscription 504). Based on this determination, the device processor may preemptively skip SR transmissions that result in Tx collision events, thereby saving power and Tx resources and preventing wasteful uplink resource allocations from the network of first subscription 502.

In an example (as illustrated in the timeline diagram 500), the device processor may determine that the packet transmission 514 of the first subscription 502 will collide with the high-priority transmission 518a of the second subscription 504 based on the timing of the SR transmission 508a. In this example, the device processor may prevent/skip the SR transmission 508a as the corresponding packet transmission 514 associated with the SR transmission 508a is expected to be lost/dropped due to a collision with the high-priority transmission 518a of the second subscription 504.

In another example, the device processor may determine that the packet transmission 516 of the first subscription 502 will not collide with any high-priority transmission of the second subscription 504 based on the timing of the SR transmission 508b. As a result, the device processor may enable the first subscription 502 to send the SR transmission 508b because the corresponding packet transmission 516 is expected to be sent successfully to the first subscription 502's network.

FIG. 6 illustrates a method 600 for preventing/skipping SR transmissions of a first subscription that are associated with packet transmissions determined to collide with higher-priority transmissions of a second subscription according to some embodiments. With reference to FIGS. 1-6, the method 600 may be implemented with a processor (e.g., the general-purpose processor 206, the baseband modem processor 216, the Tx collision management unit 230, a separate controller, and/or the like) of a mobile communication device (e.g., the mobile communication device 200). The operations of the method 600 implement some embodiments of the operations of the method 400 as described. Thus, the device processor may begin performing the operations of the method 600 in response to determining that an SR transmission (i.e., an upcoming transmission) is about to occur in determination block 406 of the method 400 (i.e., when determination block 406="Yes").

In block 602, the device processor may determine a time at which the SR transmission for the first subscription is scheduled to occur. As described (see FIG. 5), the device processor may have access to the transmission schedule of the first subscription and/or may determine the transmission schedule of the first subscription based on information received directly from the first subscription and/or from the first subscription's network. For example, the device processor may receive information from the first subscription's network indicating that the first subscription sends SR transmissions periodically (e.g., every certain number of milliseconds).

Based on the time at which the SR transmission is scheduled to occur as determined in block 602, the device processor may determine the time at which a packet transmission associated with the SR transmission is scheduled to occur, in block 604. In some embodiments, the packet transmission may be a PUSCH transmission that includes one or more data packets related to the first subscription's data call.

In block 606, the device processor may determine the second subscription's transmission schedule during the time at which the packet transmission of the first subscription is scheduled to occur as determined in block 604.

Based on the time determined in block 604 and the second subscription's transmission schedule as determined in block 606, the device processor may determine whether the packet transmission of the first subscription will collide with a transmission of the second subscription, in determination block 608. In response to determining that the packet transmission will not collide with the transmission of the second subscription (i.e., determination block 608="No"), the device processor may send the SR transmission to the first subscription's network as usual, in block 614. In other words, because the packet transmission associated with the SR transmission will not collide with a transmission of the second subscription, the SR transmission may ultimately result in a packet transmission that is successfully sent to the first subscription's network.

In response to determining that the packet transmission will collide with a transmission of the second subscription (i.e., determination block 608="Yes"), the device processor may optionally determine whether a threshold number of previously skipped SR transmissions has been reached, in optional determination block 610. In some embodiments, the device processor may maintain a count of the number of consecutive SR transmissions that have been skipped/prevented and may continue skipping/preventing SR transmissions that cause a Tx collision event to occur between the first subscription and the second subscription until the threshold number of previously skipped SR transmissions has been reached. For example, the device processor may skip only a certain number of consecutive SR transmissions before enabling the first subscription to send the SR transmission, even though the corresponding packet transmission is likely to collide with a higher-priority transmission of the second subscription and be lost/dropped. Thus, in response to determining that a threshold number of previously skipped SR transmissions has been reached (i.e., optional determination block 610="Yes"), the device processor may send the SR transmission to the first subscription's network as usual, in block 614, as described.

In response to determining that a threshold number of previously skipped SR transmissions has not been reached (i.e., optional determination block 610="No") or determining that the packet transmission will collide with a transmission of the second subscription (i.e., determination block 608="Yes"), the device processor may optionally determine whether a threshold period of time has elapsed since the most recent SR transmission was sent to the first subscription's network, in optional determination block 611. In some embodiments, in addition to (or instead of) maintaining a count of the number of SR transmissions that have been skipped for the first subscription (see optional determination block 610), the device processor may maintain a timer that measures a period of time since the most recent SR transmission was sent to the first subscription's network. In such embodiments, the threshold period of time may indicate a maximum period of time that SR transmissions may be skipped/prevented before an SR transmission must be sent to the first subscription's network (e.g., to maintain a connection with the first subscription's network).

In response to determining that the threshold period of time has elapsed since the most recent SR transmission was sent to the first subscription's network (i.e., optional determination block 611="Yes"), the device processor may send the SR transmission to the first subscription's network as usual, in block 614, as described. In response to determining that the threshold period of time has not elapsed since the most recent SR transmission was sent to the first subscription's network (i.e., optional determination block 611="No") or determining that a threshold number of previously skipped SR transmissions has not been reached (i.e., optional determination block 610="No"), the device processor may prevent the SR transmission from being sent to the first subscription's network in block 612.

After sending the SR transmission in block 614 or preventing SR transmission in block 612, the device processor may continue performing operations in block 404 of the method 400 by again monitoring the first subscription's transmission schedule for an upcoming transmission.

Figure 7:
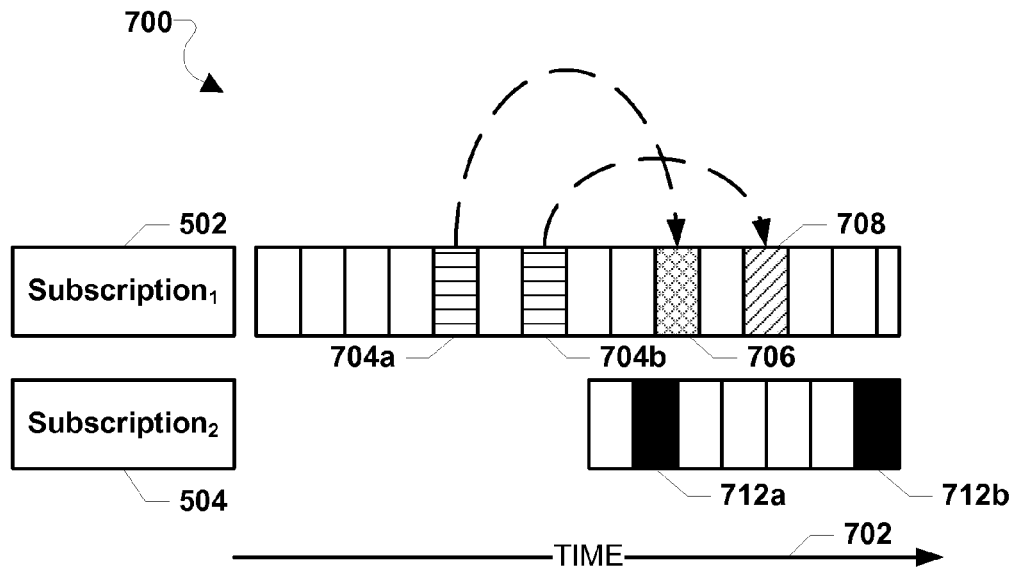
FIG. 7 is another timeline diagram illustrating transmission schedules of a first subscription and a second subscription according to various embodiments.
Figure 7:
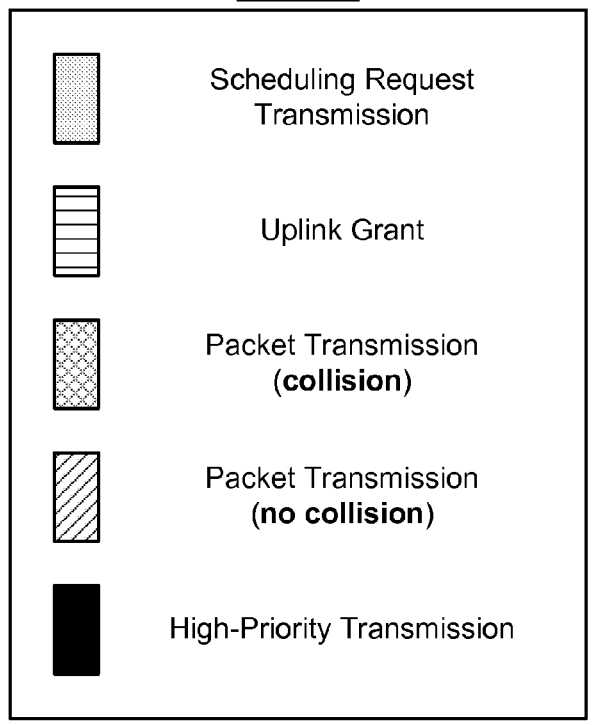

FIG. 7 is a timeline diagram 700 illustrating transmission schedules of a first subscription and a second subscription over time 702 while the subscriptions are operating in a connected mode on a mobile communication device. With reference to FIGS. 1-7, a device processor of a mobile communication device (e.g., the mobile communication device 200) may determine and/or access transmission schedules for the first subscription 502 and the second subscription 504 for use in rescheduling transmissions of the first subscription 502 to avoid collisions with the transmissions of the second subscription 504.

In some embodiments, the first subscription 502 may receive one or more uplink grants from the network of the first subscription 502 that indicate a time at which the first subscription 502 may send packet transmissions to a network of the first subscription 502. For example, the first subscription 502 may receive uplink grants 704a, 704b that indicate times at which the first subscription 502 may send packet transmissions 706, 708, respectively. For ease of description/illustration, the associations between the uplink grants 704a, 704b and the packet transmissions 706, 708 are represented by dashed lines.

As described (see, e.g., FIG. 5-6), the device processor may prevent SR transmissions of the first subscription 502 that ultimately result in a collision between a packet transmission and a high-priority transmission of the second subscription 504. In some embodiments, the device processor may alternatively (or additionally) reschedule when messages of the first subscription 502 are transmitted based on the messages' priorities. Specifically, the device processor may identify packet transmissions that will collide with transmission(s) of the second subscription 504 based on corresponding uplink grants and may reschedule high-priority messages to be included in packet transmissions that are not at risk of colliding with transmissions of the second subscription 504. These high-priority messages may represent various measurements, commands, requests, and/or other information that the first subscription may need to send to the first subscription's network to maintain adequate service/performance. For example, a high-priority message may include information that the network of the first subscription 502 may use to cause the first subscription 502 to perform a handover operation to a neighboring cell that offers superior performance in comparison with a current serving cell of the first subscription 502. In contrast, low-priority messages may include information that is not essential (or not immediately essential) to the performance of the first subscription 502.

Thus, as illustrated, the device processor may determine that the uplink grant 704a is associated with the packet transmission 706 that will collide with a high-priority transmission 712a of the second subscription 504. As a result, the device processor may not include high-priority messages in the packet transmission 706 in order to avoid losing those high-priority messages due to a collision with the high-priority transmission 712a. In some embodiments, the device processor may include low-priority messages as part of the packet transmission 706 even though the packet transmission 706 will collide with the high-priority transmission 712a of the second subscription 504. In alternative embodiments, the device processor may not include any messages as any data packets included in the packet transmission 706 as the messages (data packets) are expected to be dropped.

In response to receiving the uplink grant 704b, the device processor may determine that the corresponding packet transmission 708 will not collide with a transmission of the second subscription 504, and thus, may determine that the packet transmission 708 is eligible to include high-priority messages that were previously omitted from the packet transmission 706. In other words, the device processor may wait to include high-priority messages in a packet transmission that is not at risk of colliding with the transmission of the second subscription 504, thus ensuring that the high-priority messages are not lost or dropped due to Tx collision with the second subscription 504.

Figure 8A:
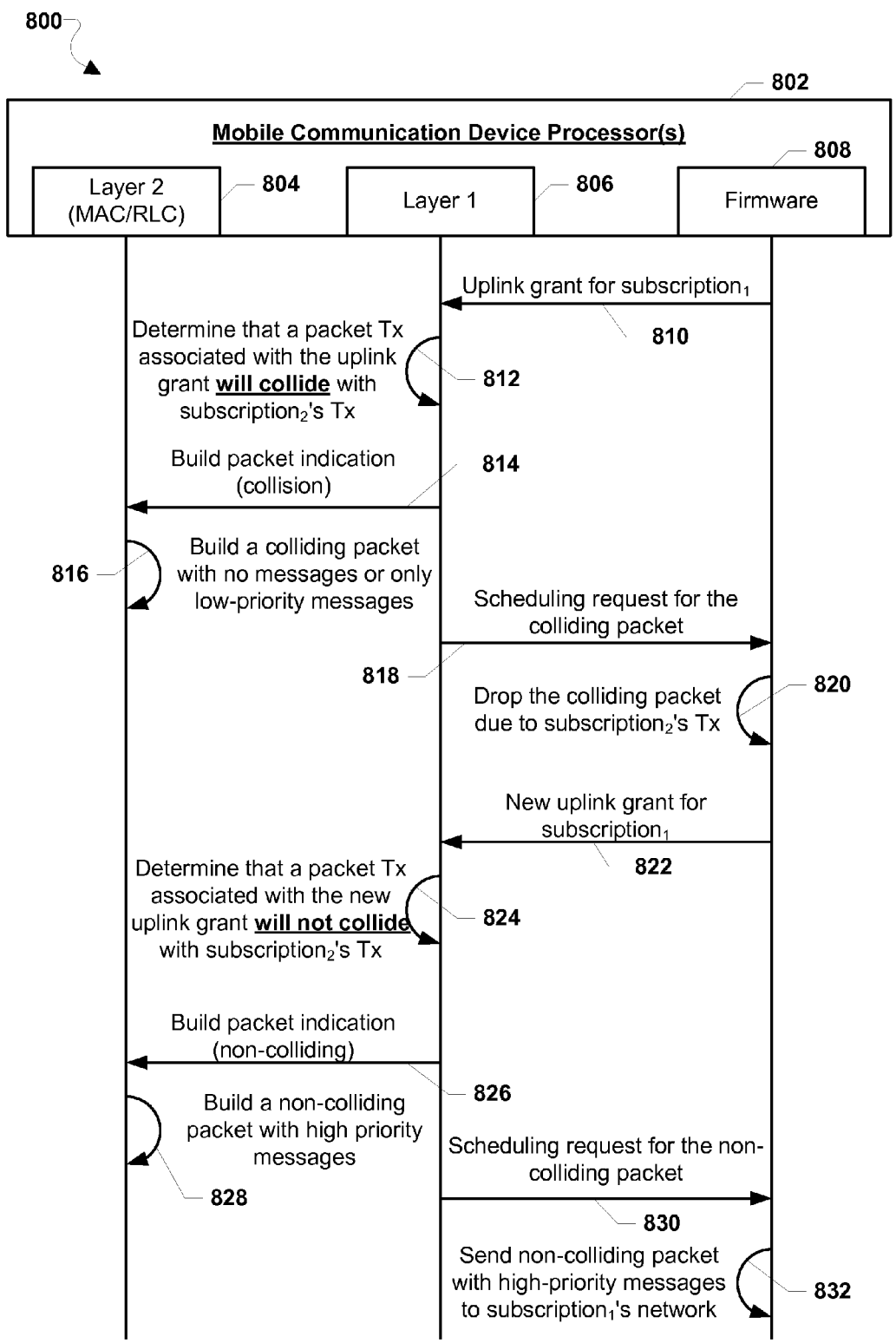
FIGS. 8A-8B are signaling and call flow diagrams illustrating communications exchanged between components of a first subscription's communication protocol stack in order to send high-priority messages in packet transmissions that will not collide with transmissions of the second subscription according to various embodiments.

FIG. 8A is a signaling and call flow diagram 800 illustrating communications exchanged between various components of a first subscription's (e.g., 502) communication protocol stack on a multi-SIM-multi-active communication device that ensure that high-priority messages are included in packet transmissions that will not collide with transmissions of a second subscription (e.g., 504).

With reference to FIGS. 1-8A, a mobile communication device (e.g., the mobile communication device 200) may include a second layer 804 of the first subscription's communication protocol stack (i.e., "Layer 2")—such as a medium access control ("MAC") layer or a radio-link-control (RLC) layer, a first layer 806 of the first subscription's communication protocol stack (i.e., "Layer 1"), and a firmware layer 808 of the first subscription's communication protocol stack (i.e., "Firmware"). In some embodiments, one or more of the communication-protocol-stack layers 804-808 may be implemented within one or more processors 802 (e.g., the general-purpose processor 206, the baseband modem processor 216, the Tx collision management unit 230, a separate controller, and/or the like). Alternatively, one or more of the communication-protocol-stack layers 804-808 may be implemented as a separate hardware and/or software processor.

In some embodiments, the firmware layer 808 may be configured to receive uplink grants from the first subscription's network and to send data packets to the first subscription's network as part of a packet transmission (see, e.g., FIG. 7).

The first layer 806 may be configured to access and/or determine the transmission schedule of the first subscription and a second subscription and, based on the transmission schedules of the first and second subscriptions, determine whether a packet transmission of the first subscription associated with an uplink grant will collide with a transmission of the second subscription. In some embodiments, the first layer 806 may request transmission schedule information related to the second subscription directly from the second subscription and/or from an intermediate scheduling component operating on the mobile communication device (e.g., the Tx collision management unit 230).

The second layer 804 may be configured to assemble/build data packets for inclusion in packet transmissions sent to the first subscription's network. In some embodiments, the second layer 804 may be configured to prioritize messages to be included in a data packet and to identify messages to include in a data packet. For example, the second layer 804 may determine that a message related to a power measurement is a high-priority message and may include that message in a data packet to be sent to the first subscription's network as part of a packet transmission.

As illustrated in an example, the firmware layer 808 may receive an uplink grant for the first subscription (i.e., "subscription₁") from the first subscription's network (not shown) and may send the uplink grant to the first layer 806 via a signal 810. In response to receiving the uplink grant via the signal 810, the first layer 806 may determine that a packet transmission associated with the received uplink grant will collide with a transmission of the second subscription (i.e., "subscription") in an operation 812. For example, the first layer 806 may reference the transmission schedule of the second subscription to determine that the second subscription is scheduled to transmit at the same time the first subscription is scheduled to send the packet transmission associated with received uplink grant received.

Based on the determination reached in the operation 812, the first layer 806 may send to the second layer 804 a packet-build-indication signal 814 indicating that any packet sent as part of a packet transmission based on the received uplink grant may be dropped due to a Tx collision with the second subscription's transmissions. In operation 816, the second layer 804 may build a packet that is anticipated to be dropped due to the second subscription's transmissions (i.e., a "colliding packet"). In some embodiments, the second layer 804 may build/assemble the colliding packet to include no messages (i.e., an "empty" packet) because the packet is expected to be dropped/lost. Alternatively, in some embodiments, the second layer 804 may build/assemble the colliding packet to include only low-priority messages, such as by prioritizing the messages to be included in the packet and only including those messages in the packet that are determined to have a low priority.

After the second layer 804 builds the colliding packet in the operation 816, the first layer may send a scheduling request for the colliding packet to the firmware layer 808 via a signal 818. The scheduling request may prompt the firmware layer 808 to schedule the colliding packet to be sent as part of a packet transmission using known methods, and the firmware layer 808 may drop the colliding packet in operation 820 due to the Tx collision between the first and second subscriptions (as anticipated by the first layer 806 in the operation 812).

While the colliding packet is dropped in the operation 820, the colliding packet may include no messages (or only low-priority messages), and thus, no high-priority messages are lost, thereby mitigating the overall impact of dropping the colliding packet because those high-priority messages may be included in a packet that is sent at a later time as part of a non-colliding packet transmission. For example, the firmware layer 808 may receive a new uplink grant for the first subscription from the first subscription's network (not shown) and may send the new uplink grant to the first layer 806 via signaling 822. The first layer 806 may determine that the packet transmission associated with the new uplink grant will not collide with the transmission of the second subscription in operation 824, such as by performing operations similar to the operation 812. In other words, the first layer 806 may determine when the packet transmission associated with the new uplink grant will occur and may determine that the second subscription is not scheduled to transmit at that time.

In response to determine that the packet transmission associated with the new uplink grant will not collide with the second subscription's transmissions in the operation 824, the first layer 806 may send a build-packet indication to the second layer 804 via a signal 826. In some embodiments, the signal 826 may also indicate that the packet is scheduled to be included in a packet transmission that will not collide with the transmission of the second subscription (i.e., that the packet is not anticipated to be dropped due to a Tx collision with the second subscription's transmissions). In response, in operation 828, the second layer 804 may build a packet (i.e., a "non-colliding" packet) that includes, among other messages, the high-priority messages that may have been previously omitted from the colliding packet in the operation 816. In other words, because the non-colliding packet is anticipated to be successfully transmitted to the first subscription's network, the second layer 804 may include high-priority messages that may have been previously excluded from former packets.

After the non-colliding packet is built/assemble in the operation 828, the first layer may send a packet-scheduling request for the non-colliding packet to the firmware layer 808 via a signal 830. In some embodiments, the signal 830 may prompt the firmware layer 808 to send the non-colliding packet to the first subscription's network in operation 832. As there is no anticipated collision with the second subscription's transmissions, the non-colliding packet may successfully reach the first subscription's network, and as a result, the first subscription's network may receive the high-priority messages from the first subscription.

Figure 8B:
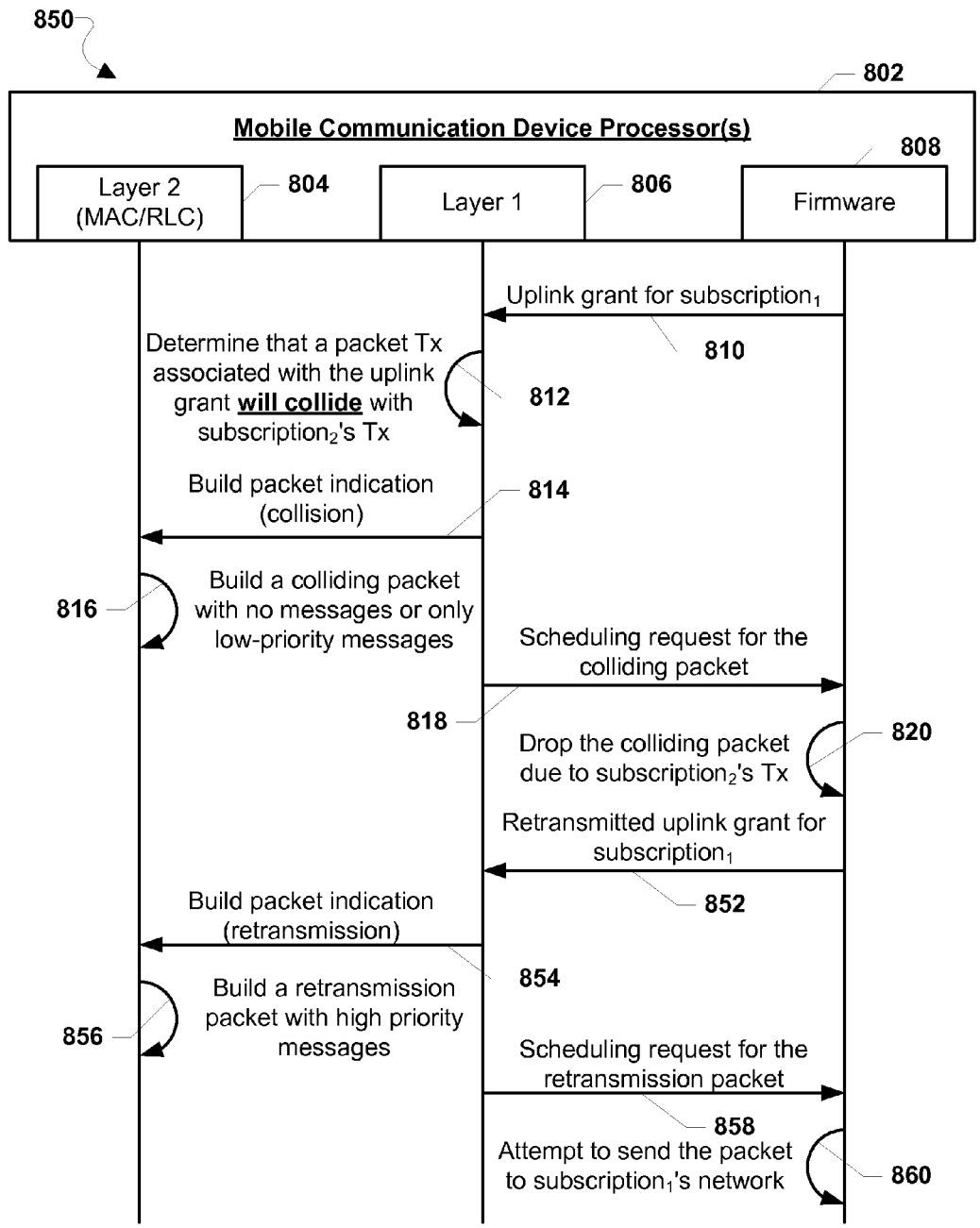

FIG. 8B is a signaling and call flow diagram 850 illustrating communications exchanged between various components of a first subscription's (e.g., 502) communication protocol stack on a multi-SIM-multi-active communication device that attempt to send high-priority messages as part of packet transmissions that will not collide with transmissions of a second subscription (e.g., 504). With reference to FIGS. 1-8B, a mobile communication device (e.g., the mobile communication device 200) may include the second layer 804, the first layer 806, and the firmware layer 808 of the first subscription's communication protocol stack. In some embodiments, the mobile communication device may include the processor(s) 802.

As described (see FIG. 8A), the communication-protocol-stack layers 804-808 may be configured to omit high-priority messages from packet transmissions anticipated to collide with a transmission of the second subscription in order to avoid losing the high-priority messages. For example, the communication-protocol-stack layers 804-808 may send signals various signals and may perform various operations to ensure that high-priority messages are not included in a colliding packet that will be dropped due to a Tx collision with the second subscription as described. For instance, the firmware layer 808 may receive an uplink grant for the first subscription from the first subscription's network (not shown) and may send the uplink grant to the first layer 806 via the signal 810, the first layer 806 may determine that a packet transmission associated with uplink grant will collide with a transmission of the second subscription in the operation 812, the first layer 806 may send a build-packet indication to the second layer 804 via the signal 814, the second layer 804 may build a colliding packet with no message or with only low-priority messages in the operation 816, the first layer 806 may send a scheduling request for the colliding packet to the firmware layer 808 via the signal 818, and the firmware layer 808 may drop the colliding packet due to the Tx collision with the second subscription in the operation 820.

In some embodiments, high-priority messages are preserved until a new uplink grant is received that is associated with a non-colliding packet transmission, at which point the high-priority messages are sent as part of the non-colliding packet transmission. For example, the mobile communication device may receive a first uplink grant associated with a colliding packet transmission, high-priority messages may be retained until a second uplink grant associated with a non-colliding packet transmission is received, and the high-priority messages may be sent to the first subscription's network via the non-colliding packet transmission.

However, in some embodiments, a retransmission of an uplink grant associated with a colliding packet transmission may be received before a new uplink grant is received. In such embodiments, the communication-protocol-stack layers 804-808 may attempt to send the high-priority messages as part of a packet transmission associated with the retransmitted uplink grant regardless of whether that packet retransmission is anticipated to collide with a transmission of the second subscription.

Thus, in the illustrated example, instead of receiving a new uplink grant (see FIG. 8A), the firmware layer 808 may receive a retransmission of a previously sent uplink grant for the first subscription (i.e., a retransmitted uplink grant) and may send the retransmitted uplink grant to the first layer 806 via a signal 852. In response, the first layer 806 may send to the second layer 804 a build-packet-indication signal 854 indicating that the uplink grant is a retransmission and that high-priority messages should be included in an assembled/built packet.

In operation 856, the second layer 804 may build/assemble a retransmission packet that includes high-priority messages that may have been excluded from previous colliding packets (see the operation 816). The first layer 806 may send a scheduling request for the retransmission packet to the firmware layer 808 via a signal 858, and the firmware layer 808 may attempt to send the packet to the first subscription's network in operation 860.

Figure 9A:
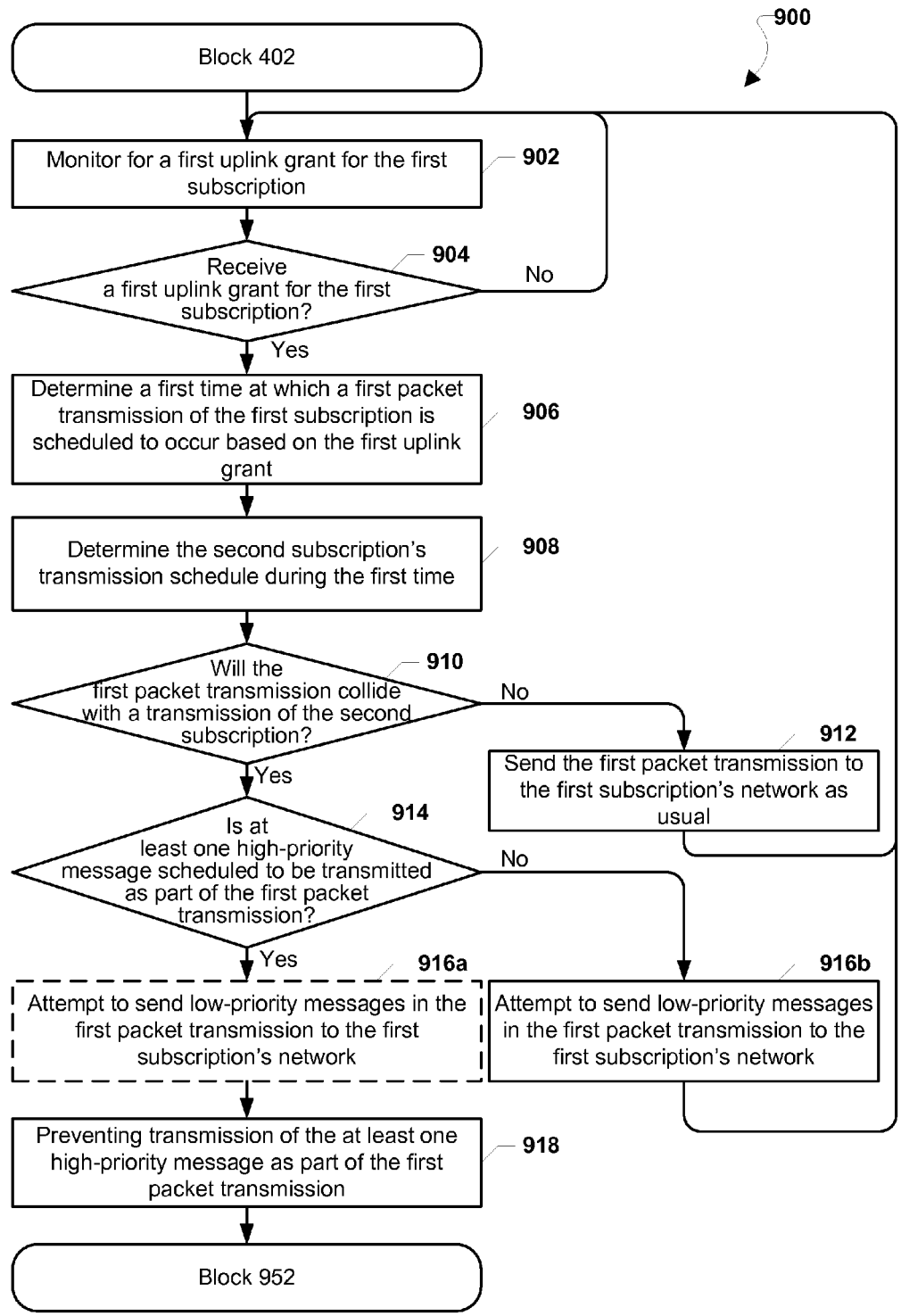
FIGS. 9A-9B are process flow diagrams illustrating a method for sending high-priority messages of the first subscription in packet transmissions that will not collide with transmissions of the second subscription according to various embodiments.
Figure 9B:
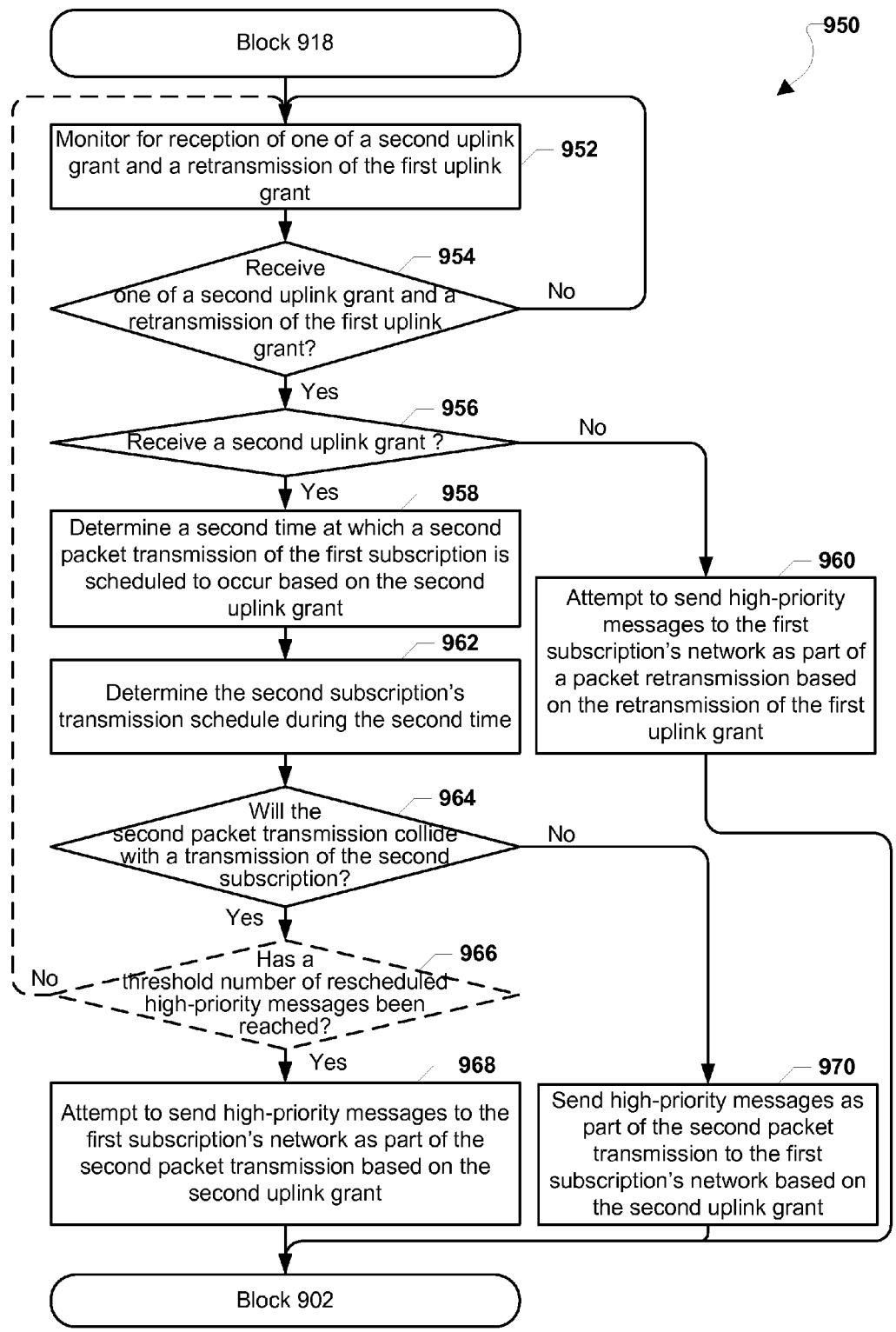

FIGS. 9A-9B illustrate methods 900, 950 for selectively scheduling high-priority messages of a first subscription (e.g., 502) to be included or omitted from packet transmissions sent to the first subscription's network based on whether the packet transmissions will collide with transmission of a second subscription (e.g., 504), according to some embodiments. With reference to FIGS. 1-9A, the methods 900, 950 may be implemented with a processor (e.g., the general-purpose processor 206, the baseband modem processor 216, the Tx collision management unit 230, communication-protocol-stack layers 804-808, the processor(s) 802, a separate controller, and/or the like) of a mobile communication device (e.g., the mobile communication device 200). The operations of the methods 900, 950 implement some embodiments of the operations of the method 400 as described.

The device processor may begin performing the operations of the method 900 while the first subscription and the second subscription are sharing a Tx resource and operating in a connected mode in block 402 of the method 400. In block 902, the device processor may monitor for a first uplink grant for the first subscription, and the device processor may continue monitoring for the first uplink grant so long as the first uplink grant for the first subscription has not been received (i.e., while determination block 904="No").

In response to determining that the first uplink grant has been received for the first subscription (i.e., determination block 904="Yes"), the device processor may determine a first time at which a first packet transmission of the first subscription is scheduled to occur based on the first uplink grant, in block 906. For example, the device processor may access or determine the transmission schedule of the first subscription and may determine the first time based on that transmission schedule and the first uplink grant. In another example, the first subscription's network may include the first time in the first uplink grant.

In block 908, the device processor may determine the second subscription's transmission schedule during the first time, such as by referencing a predetermined schedule transmissions associated with the second subscription, as described (see, e.g., FIG. 6).

Based on the first time determined in block 906 and the second subscription's transmission schedule determined in block 908, the device processor may determine whether the first packet transmission will collide with a transmission of the second subscription, in determination block 910. In response to determining that the first packet transmission will not collide with the transmission of the second subscription (i.e., determination block 910="No"), the device processor may send the first packet transmission to the first subscription's network via known methods/techniques, in block 912.

In response to determining that the first packet transmission will collide with the transmission of the second subscription (i.e., determination block 910="Yes"), the device processor may determine whether at least one high-priority message is scheduled to be transmitted as part of the first packet transmission, in determination block 914. In some embodiments, a medium access control layer of the first subscription's communication protocol stack (e.g., the second layer 804) may identify the messages scheduled to be sent as part of the first packet transmission and may determine the respective priorities of the messages based on various criteria.

In response to determining that no high-priority messages are scheduled to be transmitted as part of the first packet transmission (i.e., determination block 914="No"), the device processor may attempt to send low-priority messages in the first packet transmission to the first subscription's network, in block 916b. In other words, because there are no high-priority messages scheduled to be transmitted as part of the first packet transmission, the device processor may attempt to send the first packet transmission despite the likelihood of colliding with a transmission of the second subscription (i.e., the likelihood of a Tx collision event occurring between the first subscription and the second subscription).

In response to sending the first packet transmission to the first subscription's network in block 912 or attempting to send low-priority messages and the first packet transmission to the first subscription's network in block 916b, the device processor may repeat the operations of the method 900 by monitoring for another uplink grant for the first subscription in block 902.

In response to determining that at least one high-priority message is scheduled to be transmitted as part of the first packet transmission (i.e., determination block 914="Yes"), the device processor may optionally attempt to send low-priority message in the first packet transmission to the first subscription's network, in block 916a, such as by performing operations similar to those described with reference to block 916b. In other words, while the device processor may omit high-priority messages from the first packet transmission due to the anticipated Tx collision with the second subscription's transmissions, the device processor may still attempt to send low-priority messages in the first packet transmission. In such embodiments, the loss of the low-priority messages may not substantially affect the transit performance of the first subscription and thus may not need to be preserved until a non-colliding packet transmission is identified in the future.

In block 918, the device processor may prevent transmission of the at least one high-priority message as part of the first packet transmission because the first packet transmission is expected to fail due to the anticipated Tx collision with the transmission of the second subscription. Thus, rather than lose the at least one high-priority message, the device processor may retain any high-priority messages and attempt to send them at a later time via a packet transmission that is not expected to collide with a transmission of the second subscription.

The device processor may continue with the method 950 illustrated in FIG. 9B according to some embodiments. With reference to FIGS. 1-9B, the device processor may begin performing the operations of the method 950 in response to preventing the transmission of the at least one high-priority message in the packet transmission that will collide with the transmission of the second subscription.

In block 952, the device processor may monitor for the reception of either a second uplink grant or a retransmission of the first uplink grant, and may continue monitoring for the reception of either the second uplink grant or the retransmission of the first uplink grant until one of these grants is received from the network of the first subscription (i.e., while determination block 954="No"). As described (see FIGS. 8A-8B), the second uplink grant may be a new uplink grant (i.e., an uplink grant that is separate from or unrelated to the first uplink grant), whereas the retransmission of the first uplink grant may refer to a previously received uplink grant (e.g., a retransmission of the first uplink grant).

In response to determining that either the second uplink grant or the retransmission of the first uplink grant has been received (i.e., determination block 954="Yes"), the device processor may determine whether a second uplink grant was received (i.e., rather than a retransmission of the first uplink grant), in determination block 956. In response to determining that a retransmission of the first uplink grant was received (i.e., determination block 956="No"), the device processor may attempt to send high-priority messages to the first subscription's network as part of a packet retransmission based on the retransmission of the first uplink grant, in block 960. In some embodiments, the device processor may continue to delay sending high-priority messages until a new uplink grant is received that is associated with a non-colliding packet transmission or until a retransmission of a previously received uplink grant (e.g., the first uplink grant) is received. In response to receiving a retransmission of a previously received uplink grant, the device processor may attempt to send the high-priority messages in a packet retransmission to the first subscription's network.

In response to determining that the second uplink grant was received (i.e., determination block 956="Yes"), the device processor may determine a second time at which a second packet transmission of the first subscription is scheduled to occur based on the second uplink grant, in block 958. The device processor may determine the second subscription's transmission schedule during the second time, in block 962. The device processor may determine whether the second packet transmission will collide with a transmission of the second subscription based on the second subscription's transmission schedule, in determination block 964. In some embodiments of the operations performed in blocks 958, 962, 964, the device processor may perform operations similar to those described with reference to blocks 906-910 of the method 900.

In response to determining that the second packet transmission will not collide with a transmission of the second subscription (i.e., determination block 964="No"), the device processor may send high-priority messages as part of the second packet transmission to the first subscription's network based on the second uplink grant, in block 970. In other words, because the device processor has determined that the second packet transmission is not at risk of colliding with a transmission of the second subscription, the device processor may include high-priority messages (e.g., those high-priority messages associated with the first uplink grant and omitted from the first packet transmission) in the second packet transmission, thereby improving the first subscription's transmit performance as the high-priority messages are not dropped/lost due to Tx collisions with the second subscription.

In response to determining that the second packet transmission will collide with the transmission of the second subscription (i.e., determination block 964="Yes"), the device processor may optionally determine whether a threshold number of rescheduled high-priority messages has been reached, in optional determination block 966. In some embodiments, the device processor may keep track of the consecutive number of times that high-priority messages have been rescheduled (i.e., omitted from packet transmissions). In such embodiments, the device processor may only prevent/reschedule transmissions of high-priority messages a threshold number of times before attempting to send the high-priority messages.

Thus, in response to determining that a threshold number of rescheduled high-priority messages has not been reached (i.e., optional determination block 966="No"), the device processor may repeat the operations of the method 950 by monitoring for the reception of a third uplink grant (i.e., a new uplink grant) or a retransmission of the first (and/or second) uplink grant, in block 952.

In response to determining that a threshold number of rescheduled high-priority messages has been reached (i.e., optional determination block 966="Yes"), the device processor may attempt to send high-priority messages to the first subscription's network as part of the second packet transmission based on the second uplink grant, in block 968. As described, the device processor may reschedule priority messages a certain number of times before attempting to send the high-priority messages despite the possibility of a Tx collision with the second subscription. In addition or as an alternative to determining that a threshold number of rescheduled high-priority messages has been reached, the device processor may determine whether a threshold amount of time has passed since the first attempt to send the high-priority message. If the threshold amount of time has passed and/or the threshold number of rescheduled high-priority messages has been reached, the device processor may attempt to send high-priority messages to the first subscription's network as part of the second packet transmission based on the second uplink grant in block 968.

After attempting to transmit high-priority messages as part of the packet retransmission based on the retransmission of the first uplink grant (block 960), attempting to send high-priority messages as part of the second packet transmission based on the second uplink grant (block 968), or sending high-priority messages as part of the second packet transmission based on the second uplink grant (block 970), the device processor may continue performing operations in block 902 of the method 900 by monitoring for another uplink grant for the first subscription.

Some conventional mobile communication devices manage communications between a subscription and the subscription's network based on two or more "levels" of transmissions/retransmissions associated with different layers of the subscription's communication protocol stack. Usually, a second/data-link layer of the subscription's communication protocol stack (e.g., a MAC or RLC layer) utilizes automatic repeat requests ("ARQ") to reliably coordinate packet transmissions and retransmissions with the subscription's network using known methods. ARQ-level transmissions/retransmission (herein referred to as "RLC-level" transmissions and/or retransmission) rely on acknowledgements from the subscription's network that a data packet has been successfully received and decoded, and RLC-level transmissions are usually very reliable, thereby requiring few retransmissions. A first/physical layer of the subscription's communication protocol stack typically utilizes hybrid-ARQ ("HARQ") to coordinate transmissions/retransmission between the subscription and the subscription's network using known methods. HARQ-level transmissions/retransmissions are generally faster than RLC-level transmissions/retransmissions, but are more prone to transmission error (and thus require comparatively more retransmissions). By utilizing multiple "levels" of transmission/retransmission, conventional mobile communication devices are able to achieve fast and reliable transmissions and retransmissions.

Further, in conventional mobile communication devices, after a packet transmission is attempted and fails, an RLC-level retransmission timer is initiated, and a packet retransmission on the RLC-level is attempted when the RLC-level retransmission timer expires. Additionally, for each RLC-level transmission/retransmission attempt, an RLC-level transmission counter is incremented until the counter reaches a threshold number of failed attempts, at which point the second layer triggers a "Radio-Link Failure" condition that indicates that the connection between the subscription and the subscription's network has been lost.

During a Tx collision event between a first subscription and a second subscription, the first subscription may be unable to access a shared Tx resource to send packet transmissions to the first subscription's network, causing the first subscription to experience RLC- and HARQ-level transmissions/retransmissions failures regardless of the actual quality of the connection between the first subscription and the first subscription's network. For example, even though the first subscription may have a strong connection to the subscription's network and may otherwise be able to successfully transmit data to the subscription's network, the first subscription may experience a transmission or retransmission "failure" because the first subscription is denied access to a shared Tx resource and unable to transmit because of the Tx collision with the second subscription.

In various embodiments, one or more processors of the mobile communication device may identify situations in which the first subscription's transmissions/retransmissions fail because of such Tx collisions with the second subscription. In response to determining that the first subscription's transmission/retransmission failures are a result of a Tx collision with the second subscription, the one or more processors may initiate an RLC-level retransmission rather than waiting for the RLC-level retransmission timer to expire. As a result, the RLC-level retransmission may begin before the RLC-level retransmission timer expires, enabling the RLC-level retransmission to occur sooner than in conventional implementations. Further, in some embodiments, the one or more processors may not increment the RLC-level transmission counter when a Tx collision with the second subscription causes the first subscription's transmissions/retransmissions to fail as these failures may not reflect the actual quality of the connection between the first subscription and the first subscription's network.

Figure 10:
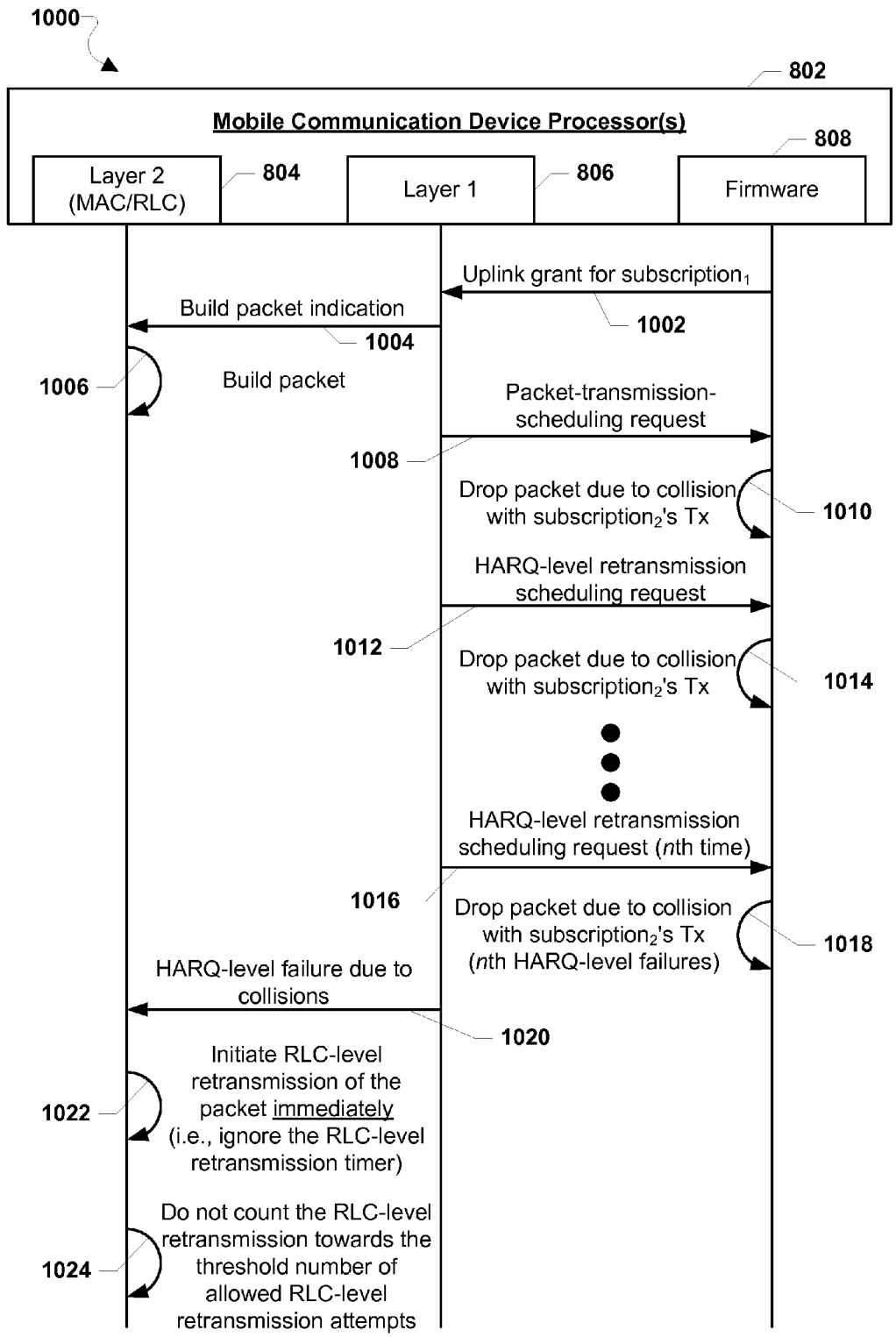
FIG. 10 is a signaling and call flow diagram illustrating communications exchanged between components in a first subscription's communication protocol in order to initiate a radio link control (RLC) level retransmission immediately in response to determining that a hybrid automatic repeat request (HARQ) level transmission failure has occurred according to various embodiments.

FIG. 10 is a signaling and call flow diagram 1000 illustrating communications exchanged between various communication-protocol-stack components of a first subscription (e.g., 502) of a multi-SIM-multi-active communication device to immediately initiate an RLC-level retransmission operation in response to determining that one or more HARQ-level retransmissions have failed because of a Tx collision with a second subscription (e.g., 504). With reference to FIGS. 1-10, a mobile communication device (e.g., the mobile communication device 200) may include the second layer 804, the first layer 806, and the firmware layer 808 of the first subscription's communication protocol stack, as described (see, e.g., FIGS. 8A-8B).

In an example illustrated in the signaling and call flow diagram 1000, the firmware layer 808 may receive an uplink grant for the first subscription from the first subscription's network (not shown) and may send the uplink grant to the first layer 806 via a signal 1002, as described (see, e.g., FIGS. 8A-8B). The first layer 806 may send a build-packet indication to the second layer 804 via a signal 1004, and in response, the second layer 804 may build a packet in operation 1006. The first layer 806 may also send a packet-transmission-scheduling request to the firmware layer 808 via a signal 1008.

As shown, the firmware layer 808 may drop the packet in operation 1010 due to a collision with a transmission of the second subscription. As described, a HARQ-level retransmission attempt may be comparatively faster than an RLC-level retransmission attempt, and thus, the firmware layer 808 may initiate a several HARQ-level retransmission attempts before initiating an RLC-level retransmission attempt. For example, the first layer 806 may send another HARQ-level retransmission request to the firmware layer 808 via a signal 1012, and the firmware layer 808 may again drop the packet in operation 1014 because of another Tx collision with the second subscription's transmissions.

In some embodiments, the first layer 806 may continue to send HARQ-level retransmission scheduling requests to the firmware layer 808 until a threshold number of HARQ-level retransmission attempts have failed. For example, the first layer 806 may send up to an nth HARQ-level retransmission scheduling request (sent via a signal 1016), and the firmware layer 808 may again drop the packet in operation 1018. In response to determining that a threshold number of HARQ-level retransmission attempts have failed (e.g., in response to the nth HARQ-level failure), the first layer 806 may immediately notify the second layer 804 that the threshold number of HARQ-level failures has been reached via a signal 1020.

In operation 1022, the second layer 804 may immediately initiate an RLC-level retransmission of the packet built in the operation 1006. Specifically, in some embodiments, the second layer 804 may ignore the RLC-level retransmission timer in order to immediately initiate the RLC-level retransmission.

In operation 1024, the second layer 804 may not count the RLC-level retransmission towards a threshold number of allowed RLC-level retransmission attempts. In other words, rather than incrementing the RLC-level retransmission counter as performed in conventional mobile communication devices, the second layer 804 may ignore RLC-level retransmission attempts that are a result of a Tx collision with the second subscription's transmissions as Tx-collision-related failures may not indicate the actual quality of the connection between the first subscription and the first subscription's network.

Figure 11:
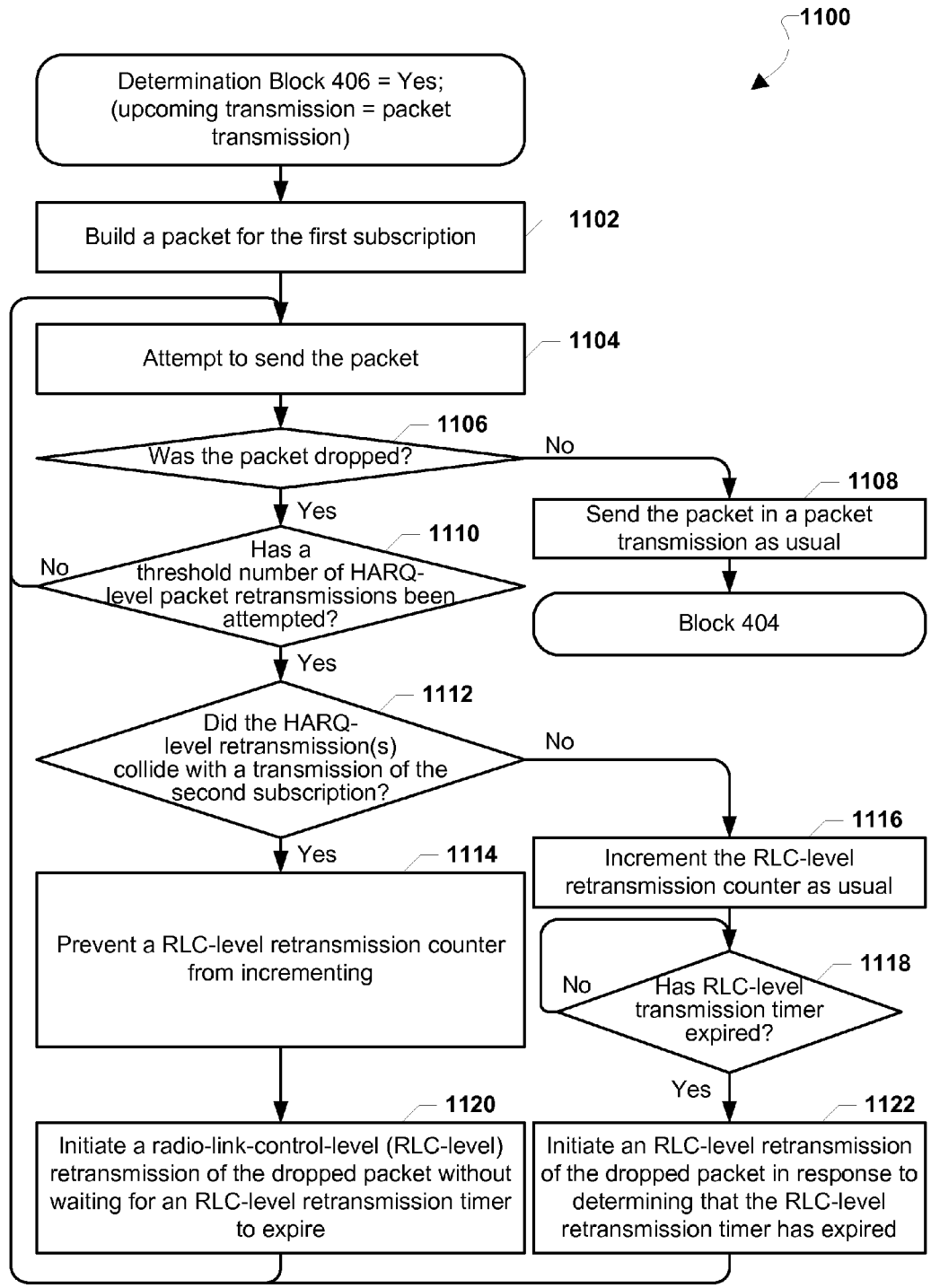
FIG. 11 is a process flow diagram illustrating a method for immediately initiating an RLC-level retransmission in response to determining that a HARQ-level retransmission failure has occurred according to various embodiments.

FIG. 11 illustrates a method 1100 for immediately initiating an RLC-level retransmission for a first subscription (e.g., 502) in response to determining that a threshold number of HARQ-level retransmission attempts of the first subscription have failed because of a Tx collision with a transmission of a second subscription (e.g., 504), according to some embodiments.

With reference to FIGS. 1-11, the method 1100 may be implemented with a processor (e.g., the general-purpose processor 206, the baseband modem processor 216, the Tx collision management unit 230, the communication-protocol-stack layers 804-808, the processor(s) 802, a separate controller, and/or the like) of a mobile communication device (e.g., the mobile communication device 200). The operations of the method 1100 implement some embodiments of the operations of the method 400 as described. Thus, the device processor may begin performing the operations of the method 1100 in response to determining that a packet transmission (i.e., an upcoming transmission) is about to occur in determination block 406 of the method 400 (i.e., determination block 406="Yes").

In block 1102, the device processor may build a packet for the first subscription. The device processor may attempt to send the packet, in block 1104.

In determination block 1106, the device processor may determine whether the packet was dropped. For example, the device processor may request acknowledgement of receipt from the destination and receive a negative acknowledgement (NACK) message indicating that the destination did not receive the packet. In some embodiments, the destination may send the NACK message without a request from the device processor. In response to determining that the packet was not dropped (i.e., determination block 1106="No"), the device processor may send the packet as part of a packet transmission as usual, in block 1108. The device processor may continue performing operations in block 404 of the method 400 by monitoring the first subscription's transmission schedule for another upcoming transmission.

In response to determining that the packet was dropped (i.e., determination block 1106="Yes"), the device processor may determine whether a threshold number of HARQ-level packet retransmissions has been attempted, in determination block 1110. As described, the device processor may initially rely on HARQ-level packet retransmissions in an effort to quickly resend the packet. In response to determining that a threshold number of HARQ-level packet retransmissions has not been attempted (i.e., determination block 1110="No"), the device processor may repeat the operations of the method 1100 by again attempting to send the packet via a HARQ-level retransmission, in block 1104.

In response to determining that a threshold number of HARQ-level packet retransmissions has been attempted (i.e., determination block 1110="Yes"), the device processor may determine whether the one or more HARQ-level packet retransmissions collided with a transmission of the second subscription, in determination block 1112. In other words, the device processor may determine whether the packet transmissions/retransmissions failures resulted from the first subscription's inability to access the shared Tx resource (i.e., a Tx collision with the second subscription) rather than another transmission problem that may be related to the condition/quality of the first subscription's connection with the first subscription's network. For example, the device processor may compare the times of the one or more HARQ-level packet retransmission attempts with times during which the second subscription was actively using the Tx resource.

In response to determining that the one or more HARQ-level packet retransmissions did not collide with the transmission of the second subscription (i.e., determination block 1112="No"), the device processor may increment the RLC-level retransmission counter, in block 1116. The device processor may determine whether the RLC-level retransmission timer has expired in determination block 1118. In response to determining that the RLC-level retransmission timer has not expired (i.e., determination block 1118="No"), the device processor may continue to wait until the RLC-level retransmission timer has expired. In response to determining that the RLC-level retransmission timer has expired (i.e., determination block 1118="Yes"), the device processor may initiate an RLC-level retransmission of the dropped packet in response to the expiration of the RLC-level retransmission timer in block 1122.

In response to determining that the one or more HARQ-level packet retransmissions collided with the transmission of the second subscription (i.e., determination block 1112="Yes"), the device processor may prevent the RLC-level retransmission counter from incrementing, in block 1114. In some embodiments, by not incrementing the RLC-level retransmission counter in situations in which Tx collisions with the second subscription prevent the first subscription from sending packet transmissions, the device processor may prevent a false determination that the first subscription is unable to communicate with the first subscription's network due to other communication problems and thus may avoid an incorrect determination that the first subscription is experiencing a "Radio Link Failure." In block 1120, the device processor may initiate an RLC-level packet retransmission of the dropped packet without waiting for the RLC-level retransmission timer to expire.

After initiating the RLC level retransmission of the dropped packet in block 1120 or in block 1122, the device processor may repeat the operations of the method 1100 by again attempting to send the dropped packet, in block 1104.

Typically, in order to receive uplink grants from a subscription's network, a conventional mobile communication device sends a buffer size report ("BSR") to the subscription's network that indicates the amount of data the first subscription has waiting in the mobile communication device's buffer that is ready for transmission to the subscription's network. In response to receiving a BSR, the subscriptions network returns an uplink grant that is typically proportional to the amount of data reported in the BSR.

Various embodiments attempt to increase the likelihood that a first subscription's network sends at least one uplink grant associated with the packet transmission that avoids a Tx collision with the second subscription by sending an artificially increased BSR to the first subscription's network in an attempt to receive multiple uplink grants. As a result of receiving multiple uplink grants, the first subscription may have a higher likelihood of identifying at least one of the multiple uplink grants associated with the packet transmission that will not collide with the transmission of the second subscription, as described (see, e.g., FIGS. 7-9B).

Figure 12:
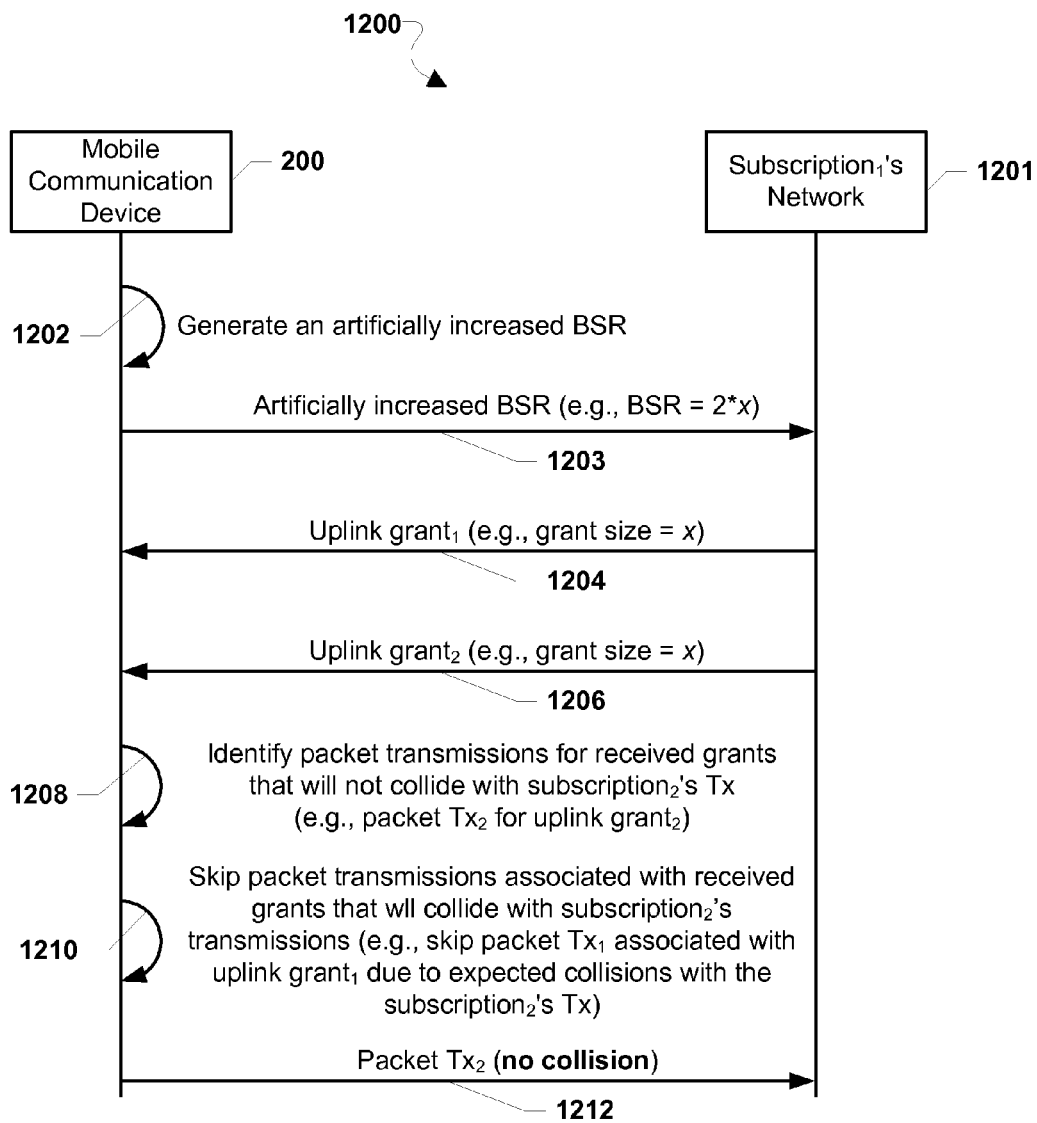
FIG. 12 is a signaling and call flow diagram illustrating communications exchanged between a mobile communication device and a first subscription's network related to reporting an artificially high buffer-size report to the network according to various embodiments.

FIG. 12 is a signaling and call flow diagram 1200 illustrating communications exchanged between a multi-SIM-multi-active communication device and a network of a first subscription according to some embodiments. With reference to FIGS. 1-12, a multi-SIM-multi-active communication device (e.g., the mobile communication device 200) may receive from a network 1201 (e.g., the mobile network 102) an artificially high number of uplink grants from the first subscription's network 1201 to increase the likelihood that the first subscription will have access to at least one uplink resource grant associated with a packet transmission that will not collide with a transmission of the second subscription.

The mobile communication device 200 may generate an artificially increased BSR in operation 1202. In some embodiments of the operation 1202, the mobile communication device 200 may determine an actual amount of data waiting to be transmitted to the first subscription's network 1201 that is stored in a buffer and may generate the artificially increased BSR based on a multiple of (or some other factor of) the actual amount of data stored in the buffer. In some embodiments, the mobile communication device 200 may generate the artificially increased BSR in an attempt to prompt the first subscription's network 1201 to send a particular number of uplink grants. For example, the mobile communication device 200 may expect to receive one uplink grant from the first subscription's network 1201 in response to reporting that x amount of data is currently stored in the buffer, and the mobile communication device may prepare a BSR that reports that 2x of data is currently stored in the buffer in an attempt to receive two uplink grants.

The mobile communication device 200 may send the artificially increased BSR (e.g., BSR=2x) to the first subscription's network 1201 via a signal 1203. In response, the first subscription's network 1201 may send the mobile communication device 200 a first uplink grant (i.e., "uplink grant$_1$") via a signal 1204 and a second uplink grant (i.e., "uplink grant$_2$") via a signal 1206. In an example in which the mobile communication device 200 reports a BSR of 2x, each of the first uplink grant and the second uplink grant may be grants of a size x.

After receiving the first and second grants from the first subscription's network 1201, the mobile communication device 200 may identify any packet transmissions associated with received grants (e.g., the first and second grants) that will not collide with the second subscription's transmissions (i.e., that will avoid a Tx collision with the second subscription) in operation 1208. For example, the device processor may determine that the packet transmission related to the second uplink grant may be scheduled a time that does not coincide (collide) with a transmission of the second subscription.

In operation 1210, the mobile communication device 200 may skip (i.e., not attempt to send) packet transmissions associated with received grants that will collide with the second subscription's transmissions. For example, the mobile communication device 200 may skip a packet transmission associated with the first uplink grant (i.e., "packet Tx$_1$") due to an expected collision with the second subscription's transmissions.

The mobile communication device 200 may attempt to send a packet transmission to the first subscription's network 1201 that will not collide with the second subscription's transmissions via a signal 1212. For example, the mobile communication device 200 may attempt to send a packet transmission associated with the second uplink grant (i.e., "packet Tx$_2$") in response to determining that that packet transmission will not collide with a transmission of the second subscription.

Figure 13:
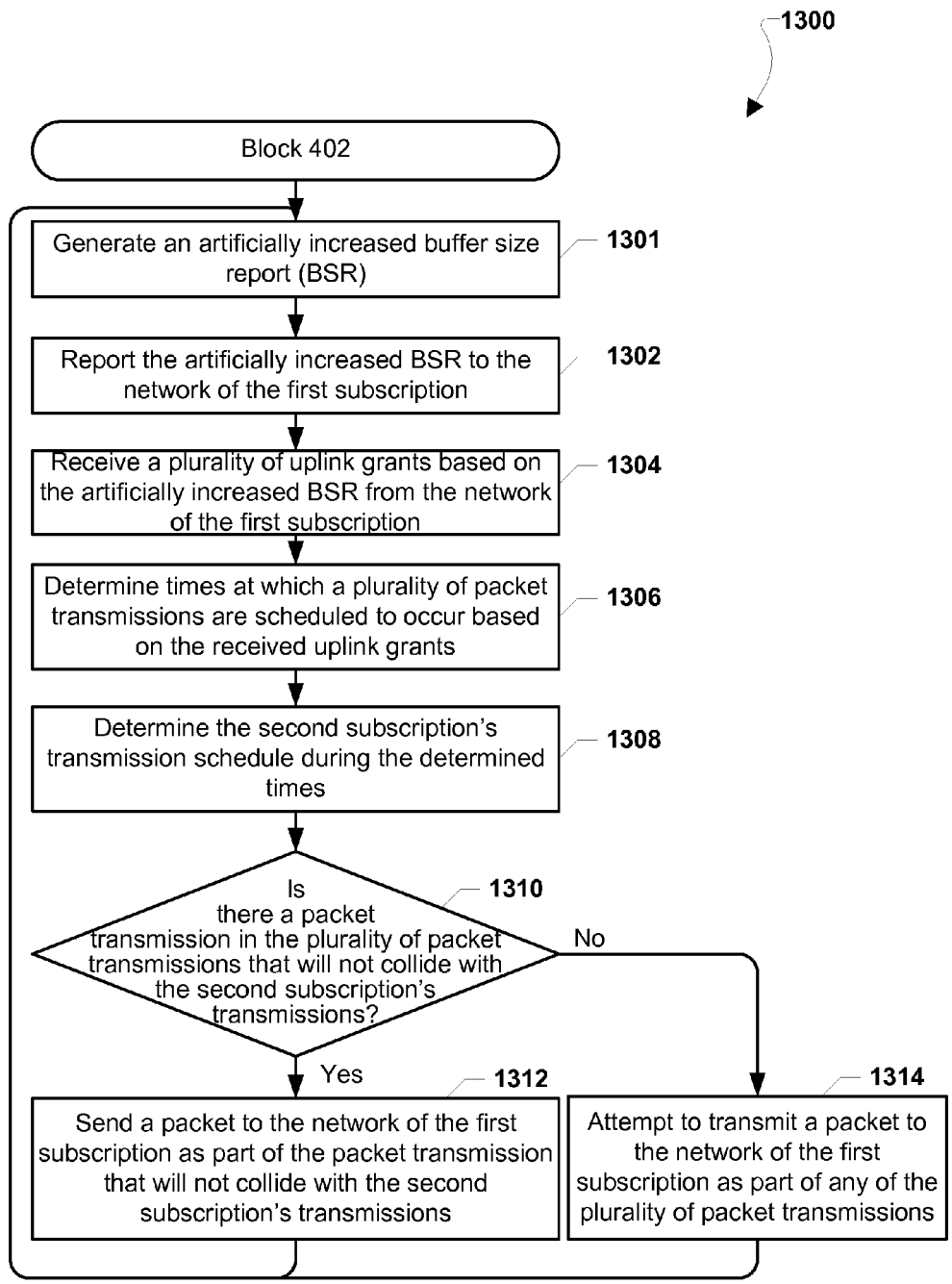
FIG. 13 is a process flow diagram illustrating a method for reporting an artificially high buffer-size report to a network of the first subscription according to various embodiments.

FIG. 13 illustrates a method 1300 for sending an artificially increased BSR to the first subscription's network to increase the likelihood of receiving an uplink grant associated with a packet transmission that will not collide with the second subscription's transmissions, according to some embodiments. With reference to FIGS. 1-13, the method 1300 may be implemented with a processor (e.g., the general-purpose processor 206, the baseband modem processor 216, the Tx collision management unit 230, a separate controller, and/or the like) of a mobile communication device (e.g., the mobile communication devices 200). The operations of the method 1300 implement some embodiments of the operations of the method 400. Thus, the device processor may begin performing the operations of the method 1300 while the first subscription and the second subscription are operating in a connected mode (i.e., block 402 of the method 400).

In block 1301, the device processor may generate an artificially increased BSR. In some embodiments of the operations performed in block 1301, the device processor may determine the actual amount of data for the first subscription that is stored in a buffer of the mobile communication device (e.g. a buffer in the memory 214 or part of the baseband modem processor 216) and awaiting transmission to the first subscription's network. Based on the actual amount of data stored in buffer for the first subscription, the device processor may generate an artificially increased BSR to reflect an amount of data in excess of the actual amount of data stored in the buffer (e.g., two times the actual amount of data). As described (see, e.g., FIG. 12), by artificially increasing the amount of data reported to the first subscription's network, the device processor may cause the first subscription's network to send additional uplink grants for use in sending packet transmissions to the first subscription's network. By receiving additional uplink grants, the device processor may have a higher likelihood of identifying at least one uplink grant that is associated with a packet transmission that will not collide with a transmission of the second subscription (i.e., that will avoid a Tx collision with the second subscription).

In block 1302, the device processor may report the artificially increased BSR to the network of the first subscription. In response, the device processor may receive a plurality of uplink grants based on the artificially increased BSR from the network of the first subscription, in block 1304.

In block 1306, the device processor may determine times at which a plurality of packet transmissions are scheduled to occur based on the received plurality of uplink grants from the first subscription's network, in block 1304. In some embodiments, the device processor may determine times in which the plurality of packet transmissions are scheduled to occur based on scheduling information received from the first subscription's network and/or from information included in the plurality of uplink grants.

In block 1308, the device processor may determine the second subscription's transmission schedule during the times determined in block 1306. In other words, the device processor may determine whether the second subscription will transmit during one or more of the plurality of packet transmissions associated with the plurality of received uplink grants. In determination block 1310, the device processor may determine whether there is a packet transmission in the plurality of packet transmissions that will not collide with the second subscription's transmissions. In some embodiments, the determination in determination block 1310 may be based on the second subscription's transmission schedule as determined in block 1308 and based on the times at which the plurality of packet transmission are scheduled to occur as determined in block 1306.

In response to determining that each packet transmission in the plurality of packet transmissions will collide with the second subscription's transmissions (i.e., determination block 1310="No"), the device processor may attempt to transmit a packet to the network of the first subscription through any of the plurality of packet transmissions, in block 1314. In other words, because each of the packet transmissions associated with the plurality of uplink grants received from the first subscription's network will collide with the second subscription's transmissions, the device processor may attempt to transmit the packet as part of one or more of the plurality of packet transmissions as those packet transmissions are expected to fail in light of the collisions with the second subscription's transmissions. In some embodiments, the device processor may not attempt to send any packet transmissions and may wait to receive additional uplink grants (see, e.g., FIGS. 7-9B).

In response to determining that there is a packet transmission in the plurality of packet transmissions that will not collide with the second subscription's transmissions (i.e., determination block 1310="Yes"), the device processor may send a packet to the network of the first subscription as part of the packet transmission that will not collide the second subscription's transmissions, in block 1312. Thus, by utilizing the non-colliding packet transmission, the device processor may have a high likelihood of successfully sending the packet.

After sending the packet to the network of the first subscription in block 1312 or attempting to transmit the packet to the network of the first subscription in block 1314, the device processor may repeat the operations of the method 1300 by again generating an artificially increased BSR, in block 1301.

As described, transmissions of the second subscription have a higher priority than the first subscription's transmissions. As a result, the second subscription may receive access to the shared Tx resource when both subscriptions are scheduled to use the shared Tx resource simultaneously, thereby negatively impacting the transmission performance of the first subscription.

However, in some embodiments, the priority for the first subscription's packet transmissions may be adjusted based on the first subscription's current radio conditions. Specifically, the device processor may increase the priority of the first subscription's messages in the event that the first subscription is suffering poor radio conditions in order to enable the first subscription to communicate with the first subscription's network, for example, to initiate a handover to a neighboring cell that offers a higher quality of service or better radio conditions. Similarly, the device processor may decrease the priority of the first subscription's messages in the event that the first subscription's radio conditions are satisfactory as enabling the first subscription to communicate with the subscription's network may be less important or necessary (i.e., the first subscription may not be at risk of losing a connection to the subscription's network).

FIG. 14 illustrates a method 1400 for prioritizing messages of a first subscription to be sent as part of a packet transmission based on the radio conditions of the first subscription, according to some embodiments. With reference to FIGS. 1-14, the method 1400 may be implemented with a processor (e.g., the general-purpose processor 206, the baseband modem processor 216, the Tx collision management unit 230, a separate controller, and/or the like) of a mobile communication device (e.g., the mobile communication device 200). The operations of the method 1400 implement some embodiments of the operations of the method 400. Thus, the device processor may begin performing the operations of the method 1400 in response to determining that a packet transmission (i.e., an upcoming transmission) will collide with the second subscription's transmissions in determination block 410 of the method 400 (i.e., determination block 410="Yes").

In block 1402, the device processor may determine current radio conditions for the first subscription. In some embodiments, the device processor may take one or more measurements for the first subscription (e.g., measurements of received signal power, antenna power, etc.) that may indicate the quality and condition of the first subscription's radio connection to the subscription's network.

In block 1404, the device processor may identify messages to be transmitted as part of the packet transmission for the first subscription, such as messages related to the first subscription's current radio conditions and/or other information that the first subscription intends to communicate to the subscription's network.

In determination block 1406, the device processor may determine whether the current radio conditions determined in block 1402 satisfy a minimum quality threshold. In some embodiments, the minimum quality threshold may indicate a satisfactory or acceptable measurement of the first subscription's radio conditions. For example, radio conditions at or above the minimum quality threshold may indicate that the first subscription is not in immediate danger of losing service, whereas radio conditions below the point threshold may indicate that the first subscription is about to experience a radio link failure unless the first subscription communicates immediately to the subscription's network to initiate a handover to better serving cell.

In response to determining that the current radio conditions of the first subscription satisfy the minimum quality threshold (i.e., determination block 1406="Yes"), the device processor may classify the messages identified in block 1404 as low-priority messages, in block 1410. In other words, because the first subscription's current radio conditions satisfy the minimum quality threshold and thus indicate that the first subscription is not at risk of losing a connection to the subscription's network (e.g., dropping a call), the device processor may classify the first subscription's messages as low priority. As such, the device processor may attempt to send the identified messages as part of a low-priority packet transmission, in block 1414. In some embodiments, because the packet transmission will collide with the second subscription's transmissions and because the packet transmission is low priority, the second subscription's transmissions will prevail over the first subscription's low-priority packet transmission (i.e., the second subscription will receive access to a shared Tx resource to the exclusion of the first subscription), and thus, the identified messages and the low-priority packet transmission will likely be dropped as a result of the Tx collision with the second subscription.

In response to determining that the current radio conditions of the first subscription do not satisfy the minimum quality threshold (i.e., determination block 1406="No"), the device processor may classify the messages identified in block 1404 as high-priority messages, in block 1408, and may send the identified messages as part of a high-priority packet transmission, in block 1412. In some embodiments, because the first subscription needs to send high-priority messages, the first subscription's high-priority packet transmission may take priority over the second subscription's transmissions. Specifically, because the high-priority packet transmission is scheduled to collide with the second subscription's transmissions, the device processor may enable the first subscription to receive access to the shared Tx resource to the exclusion of the second subscription to enable the first subscription to send the high-priority packet transmission. As a result of enabling the first subscription to prevail over the second subscription during the Tx collision event, the device processor may increase the likelihood that the first subscription will be able to communicate with the first subscription's network and may be able to improve radio conditions with the network, such as by negotiating a handover to a better serving cell.

After sending the high-priority packet transmission in block 1412 or sending a low-priority packet transmission in block 1414, the device processor may continue performing operations in block 404 of the method 400 by again monitoring the first subscription's transmission schedule for an upcoming transmission.

Figure 15:
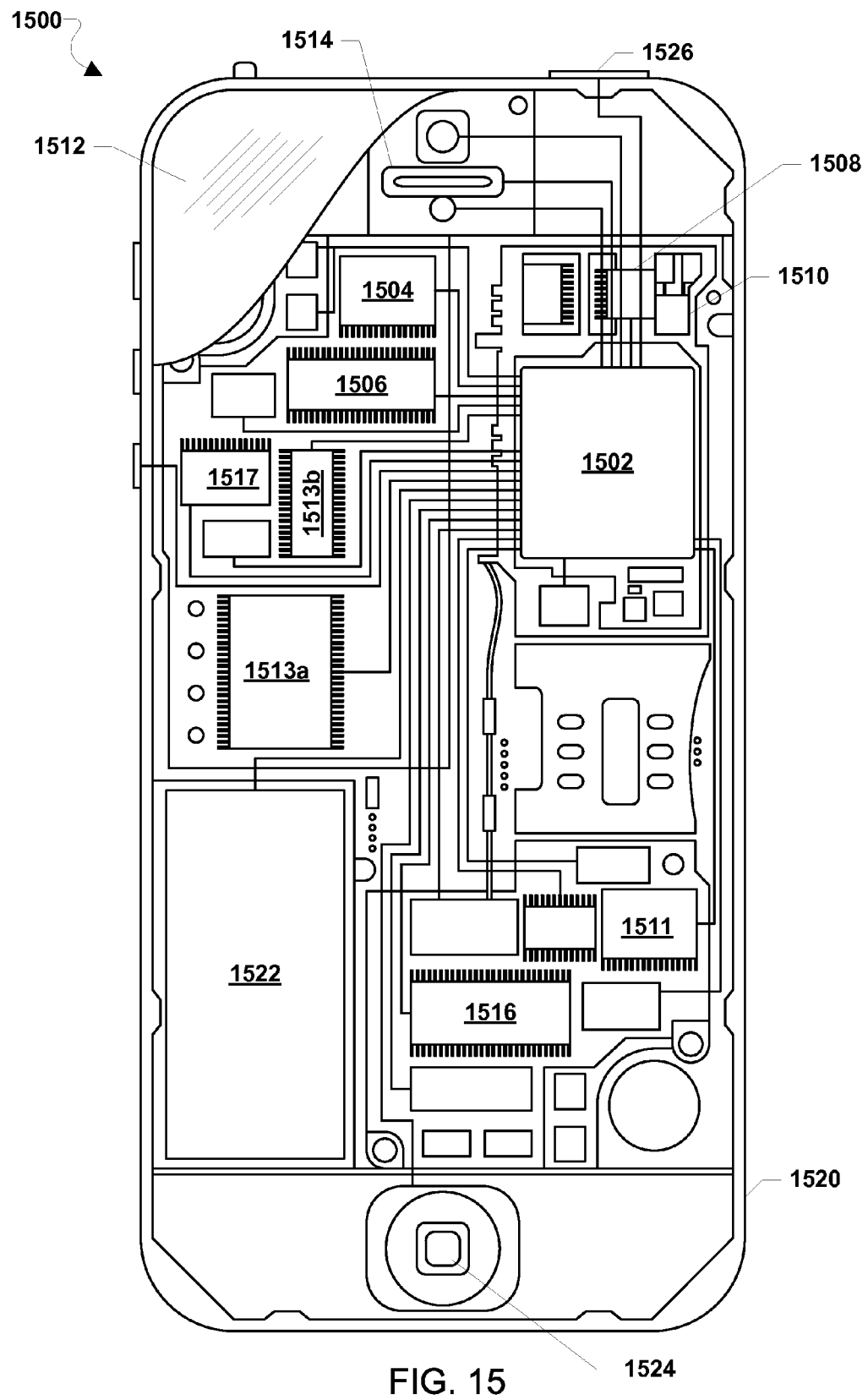
FIG. 15 is a component block diagram of a multi-SIM-multi-active communication device suitable for implementing some embodiment methods.

Various embodiments may be implemented in any of a variety of mobile communication devices, an example on which (e.g., mobile communication device 1500) is illustrated in FIG. 15. With reference to FIGS. 1-15, the mobile communication device 1500 may be similar to the mobile communication devices 110, 120, 200 as described. As such, the mobile communication device 1500 may implement any of the methods 400, 600, 900, 950, 1100, 1300, 1400.

The mobile communication device 1500 may include a processor 1502 coupled to a touchscreen controller 1504 and an internal memory 1506. The processor 1502 may be one or more multi-core integrated circuits designated for general or specific processing tasks. The internal memory 1506 may be volatile or non-volatile memory, and may also be secure and/or encrypted memory, or unsecure and/or unencrypted memory, or any combination thereof. The touchscreen controller 1504 and the processor 1502 may also be coupled to a touchscreen panel 1512, such as a resistive-sensing touchscreen, capacitive-sensing touchscreen, infrared sensing touchscreen, etc. Additionally, the display of the mobile communication device 1500 need not have touch screen capability.

The mobile communication device 1500 may have one or more cellular network transceivers 1508, 1516 coupled to the processor 1502 and to two or more antennae 1510, 1511 and configured for sending and receiving cellular communications. The transceivers 1508, 1516 and the antennae 1510, 1511 may be used with the above-mentioned circuitry to implement the various embodiment methods. The mobile communication device 1500 may include two or more SIM cards (e.g., SIMs 1513a, 1513b) coupled to the transceivers 1508, 1516 and/or the processor 1502 and configured as described. The mobile communication device 1500 may include a cellular network wireless modem chip 1517 that enables communication via a cellular network and is coupled to the processor 1502.

The mobile communication device 1500 may also include speakers 1514 for providing audio outputs. The mobile communication device 1500 may also include a housing 1520, constructed of a plastic, metal, or a combination of materials, for containing all or some of the components discussed herein. The mobile communication device 1500 may include a power source 1522 coupled to the processor 1502, such as a disposable or rechargeable battery. The rechargeable battery may also be coupled to the peripheral device connection port to receive a charging current from a source external to the mobile communication device 1500. The mobile communication device 1500 may also include a physical button 1524 for receiving user inputs. The mobile communication device 1500 may also include a power button 1526 for turning the mobile communication device 1500 on and off.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, compact disc read only memory (CD-ROM) or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present claims. Various modifications to these embodiments will be readily apparent to those skilled in the art, and the generic principles defined herein may be applied to some embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method performed by a mobile communication device for managing potential transmitter collisions of a first subscription, comprising:
   determining a first time at which a scheduling request (SR) transmission of the first subscription is scheduled to occur;
   determining a second time at which a packet transmission of the first subscription is scheduled to occur based on the first time;
   determining a transmission schedule of a second subscription during the second time;
   determining whether the packet transmission will collide with a transmission of the second subscription based on the transmission schedule of the second subscription; and
   implementing a transmit (Tx) collision management strategy for the first subscription in response to determining that the packet transmission of the first subscription will collide with the transmission of the second subscription, wherein implementing the Tx collision management strategy comprises:
      determining whether a threshold number of previously skipped SR transmissions has been reached in response to determining that the packet transmission will collide with the transmission of the second subscription;
      preventing transmission of the SR transmission to a network of the first subscription in response to determining that the threshold number of previously skipped SR transmissions has not been reached; and
      sending the SR transmission to the network of the first subscription in response to determining that the threshold number of previously skipped SR transmissions has been reached.

2. The method of claim 1, wherein the first subscription and the second subscription are subscriptions to different radio access technologies.

3. The method of claim 1, further comprising:
   transmitting the SR transmission to the network of the first subscription in response to determining that the packet transmission will not collide with the transmission of the second subscription.

4. The method of claim 1, wherein implementing the Tx collision management strategy for the first subscription in response to determining that the packet transmission of the first subscription will collide with the transmission of the second subscription comprises:
   determining whether a threshold period of time has elapsed since a previous SR transmission was sent to the network of the first subscription;
   preventing transmission of the SR transmission to the network of the first subscription in response to determining that the threshold period of time has not elapsed since the previous SR transmission was sent to the network of the first subscription; and
   sending the SR transmission to the network of the first subscription in response to determining that the threshold period of time has elapsed since the previous SR transmission was sent to the network of the first subscription.

5. The method of claim 1, wherein the first subscription has a lower priority than the second subscription.

6. The method of claim 5, wherein the first subscription is engaged in a data call and the second subscription is engaged in a voice call.

7. A mobile communication device, comprising:
   a memory;
   a radio frequency (RF) resource; and
   a processor coupled to the memory and the RF resource, configured to be coupled to a plurality of Subscriber Identity Modules (SIMs), and configured with processor-executable instructions to:
      determine a first time at which a scheduling request (SR) transmission of a first subscription is scheduled to occur;
      determine a second time at which a packet transmission of the first subscription is scheduled to occur based on the first time;
      determine a transmission schedule of a second subscription during the second time;
      determine whether the packet transmission will collide with a transmission of the second subscription based on the transmission schedule of the second subscription; and
      implement a transmit (Tx) collision management strategy for the first subscription in response to determining that the packet transmission of the first subscription will collide with the transmission of the second subscription by:
         determining whether a threshold number of previously skipped SR transmissions has been reached in response to determining that the packet transmission will collide with the transmission of the second subscription;
         preventing transmission of the SR transmission to a network of the first subscription in response to determining that the threshold number of previously skipped SR transmissions has not been reached; and
         sending the SR transmission to the network of the first subscription in response to determining that the threshold number of previously skipped SR transmissions has been reached.

8. The mobile communication device of claim 7, wherein the first subscription and the second subscription are subscriptions to different radio access technologies.

9. The mobile communication device of claim 7, wherein the processor is further configured with processor-executable instructions to transmit the SR transmission to the network of the first subscription in response to determining that the packet transmission will not collide with the transmission of the second subscription.

10. The mobile communication device of claim 7, wherein the processor is further configured with processor-executable instructions to implement the Tx collision management strategy for the first subscription in response to determining that the packet transmission of the first subscription will collide with the transmission of the second subscription by:
   determining whether a threshold period of time has elapsed since a previous SR transmission was sent to the network of the first subscription;
   preventing transmission of the SR transmission to the network of the first subscription in response to determining that the threshold period of time has not elapsed since the previous SR transmission was sent to the network of the first subscription; and
   sending the SR transmission to the network of the first subscription in response to determining that the threshold period of time has elapsed since the previous SR transmission was sent to the network of the first subscription.

11. The mobile communication device of claim 7, wherein the first subscription has a lower priority than the second subscription.

12. The mobile communication device of claim 11, wherein the first subscription is engaged in a data call and the second subscription is engaged in a voice call.

13. A mobile communication device, comprising:
- means for determining a first time at which a scheduling request (SR) transmission of a first subscription is scheduled to occur;
- means for determining a second time at which a packet transmission of the first subscription is scheduled to occur based on the first time;
- means for determining a transmission schedule of a second subscription during the second time;
- means for determining whether the packet transmission will collide with a transmission of the second subscription based on the transmission schedule of the second subscription; and
- means for implementing a transmit (Tx) collision management strategy for the first subscription in response to determining that the packet transmission of the first subscription will collide with the transmission of the second subscription, wherein the means for implementing the Tx collision management strategy comprises:
  - means for determining whether a threshold number of previously skipped SR transmissions has been reached in response to determining that the packet transmission will collide with the transmission of the second subscription;
  - means for preventing transmission of the SR transmission to a network of the first subscription in response to determining that the threshold number of previously skipped SR transmissions has not been reached; and
  - means for sending the SR transmission to the network of the first subscription in response to determining that the threshold number of previously skipped SR transmissions has been reached.

14. A non-transitory processor-readable storage medium having stored thereon processor-executable instructions configured to cause a processor of a mobile communication device to perform operations comprising:
- determining a first time at which a scheduling request (SR) transmission of a first subscription is scheduled to occur;
- determining a second time at which a packet transmission of the first subscription is scheduled to occur based on the first time;
- determining a transmission schedule of a second subscription during the second time;
- determining whether the packet transmission will collide with a transmission of the second subscription based on the transmission schedule of the second subscription; and
- implementing a transmit (Tx) collision management strategy for the first subscription in response to determining that the packet transmission of the first subscription will collide with the transmission of the second subscription, wherein implementing the Tx collision management strategy comprises:
  - determining whether a threshold number of previously skipped SR transmissions has been reached in response to determining that the packet transmission will collide with the transmission of the second subscription;
  - preventing transmission of the SR transmission to a network of the first subscription in response to determining that the threshold number of previously skipped SR transmissions has not been reached; and
  - sending the SR transmission to the network of the first subscription in response to determining that the threshold number of previously skipped SR transmissions has been reached.

15. The non-transitory processor-readable storage medium of claim 14, wherein the first subscription and the second subscription are subscriptions to different radio access technologies.

16. The non-transitory processor-readable storage medium of claim 14, wherein the stored processor-executable instructions are further configured to cause the processor of the mobile communication device to perform operations comprising transmitting the SR transmission to the network of the first subscription in response to determining that the packet transmission will not collide with the transmission of the second subscription.

17. The non-transitory processor-readable storage medium of claim 14, wherein the stored processor-executable instructions are configured to cause the processor of the mobile communication device to perform operations such that implementing the Tx collision management strategy for the first subscription in response to determining that the packet transmission of the first subscription will collide with the transmission of the second subscription comprises:
- determining whether a threshold period of time has elapsed since a previous SR transmission was sent to the network of the first subscription;
- preventing transmission of the SR transmission to the network of the first subscription in response to determining that the threshold period of time has not elapsed since the previous SR transmission was sent to the network of the first subscription; and
- sending the SR transmission to the network of the first subscription in response to determining that the threshold period of time has elapsed since the previous SR transmission was sent to the network of the first subscription.

* * * * *